United States Patent
Shapira

(10) Patent No.: US 9,600,259 B2
(45) Date of Patent: Mar. 21, 2017

(54) PROGRAMMATIC INSTALLATION AND NAVIGATION TO ACCESS DEEP STATES OF UNINSTALLED APPLICATIONS

(71) Applicant: Quixey, Inc., Mountain View, CA (US)

(72) Inventor: Liron Shapira, Mountain View, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

(21) Appl. No.: 15/183,751

(22) Filed: Jun. 15, 2016

(65) Prior Publication Data

US 2016/0299751 A1    Oct. 13, 2016

Related U.S. Application Data

(63) Continuation of application No. 14/630,782, filed on Feb. 25, 2015.

(60) Provisional application No. 62/093,509, filed on Dec. 18, 2014, provisional application No. 61/944,497, filed on Feb. 25, 2014.

(51) Int. Cl.
| | |
|---|---|
| *G06F 9/445* | (2006.01) |
| *G06F 17/30* | (2006.01) |
| *G06F 3/0484* | (2013.01) |
| *G06F 3/0482* | (2013.01) |
| *G06F 3/0481* | (2013.01) |
| *G06F 3/0488* | (2013.01) |
| *H04L 29/08* | (2006.01) |

(52) U.S. Cl.
CPC .............. *G06F 8/61* (2013.01); *G06F 3/0482* (2013.01); *G06F 3/04817* (2013.01); *G06F 3/04842* (2013.01); *G06F 3/04847* (2013.01); *G06F 3/04886* (2013.01); *G06F 17/30392* (2013.01); *G06F 17/30554* (2013.01); *G06F 17/30893* (2013.01); *H04L 67/10* (2013.01)

(58) Field of Classification Search
CPC ......... G06F 17/30392; G06F 17/30554; G06F 3/04842
USPC ....................................... 717/178
See application file for complete search history.

(56) References Cited

U.S. PATENT DOCUMENTS

| | | | |
|---|---|---|---|
| 7,010,624 B1* | 3/2006 | Zhou .................. | G06F 9/4415 710/15 |
| 7,210,131 B2* | 4/2007 | Schmidt ............ | G06F 9/4451 717/137 |
| 2003/0074386 A1* | 4/2003 | Schmidt ............ | G06F 9/4451 718/1 |

* cited by examiner

*Primary Examiner* — John Chavis
(74) *Attorney, Agent, or Firm* — Harness, Dickey & Pierce, P.L.C.

(57) ABSTRACT

A mobile computing device includes a touchscreen, a transceiver, one or more processors, and a non-transitory memory that stores computer readable instructions. The instructions cause the processors to receive, via the transceiver, a link associated with an uninstalled native application. The instructions display an indication of the link on the touchscreen. The instructions detect, via the touchscreen, a user selection of the link and provide access to a digital distribution platform for downloading and installing the native application. The instructions download and install the native application onto the mobile computing device. The instructions, upon downloading and installing the native application, automatically launch the native application into the particular state indicated by the link, wherein the particular state is different from a default state into which the native application launches when an icon corresponding to the native application is selected.

20 Claims, 14 Drawing Sheets

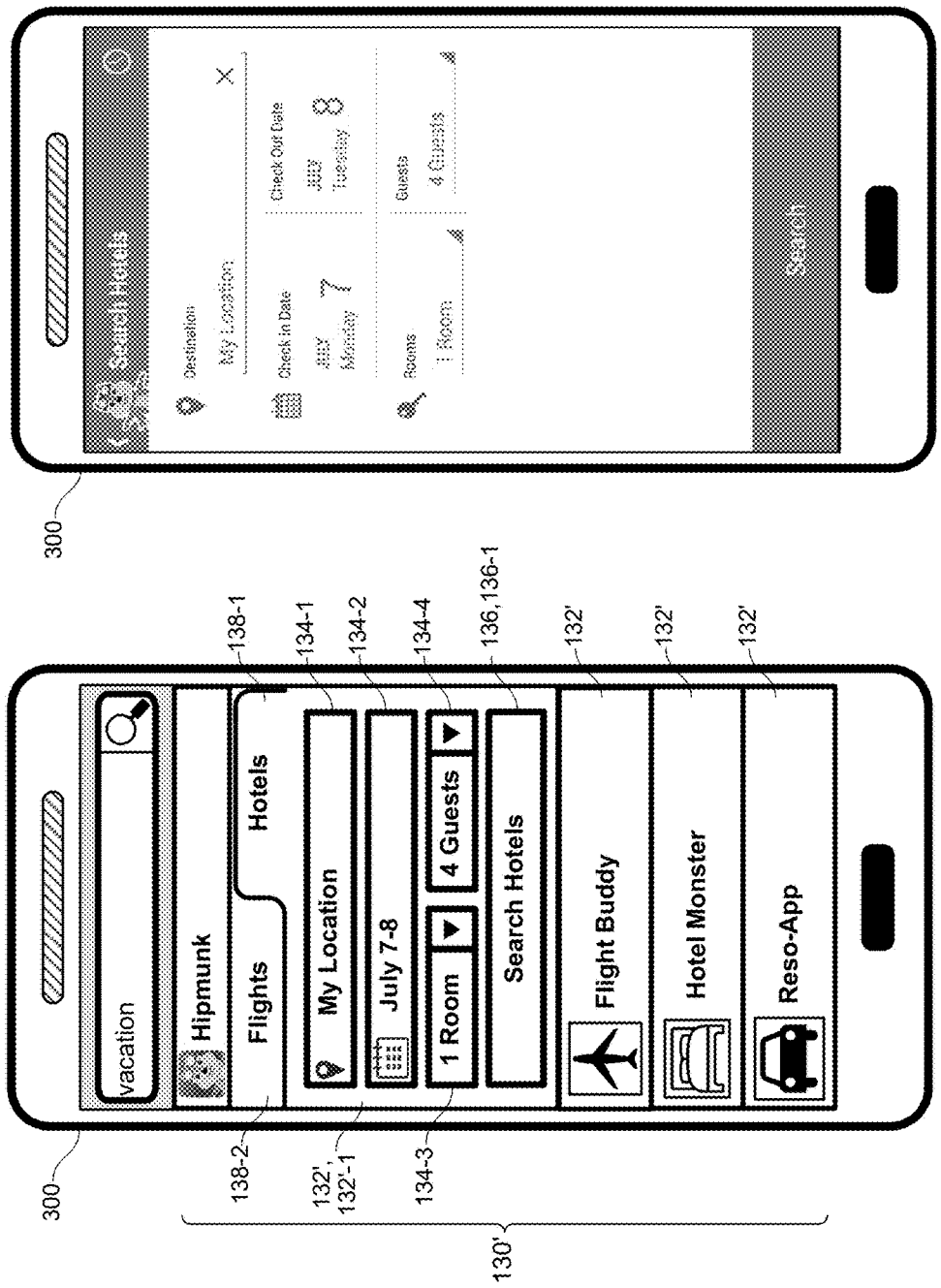

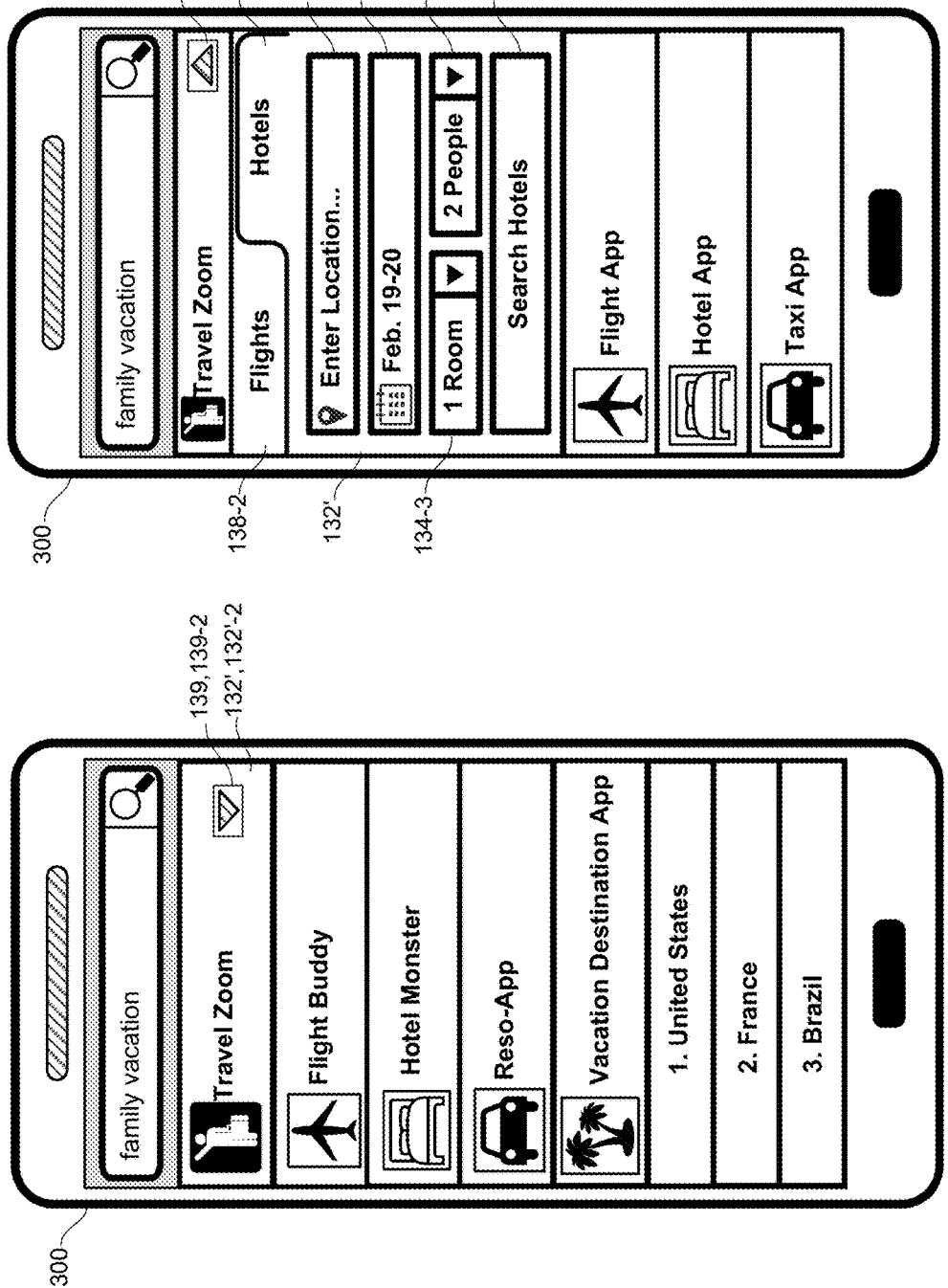

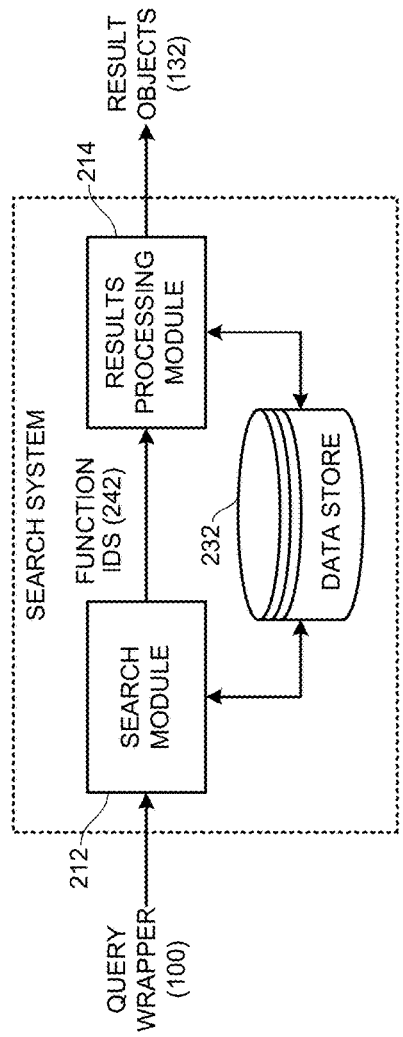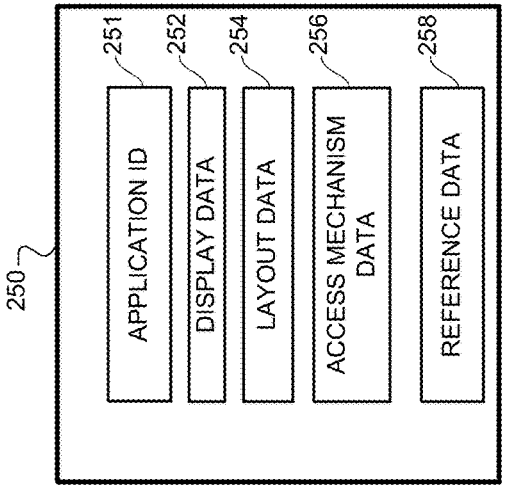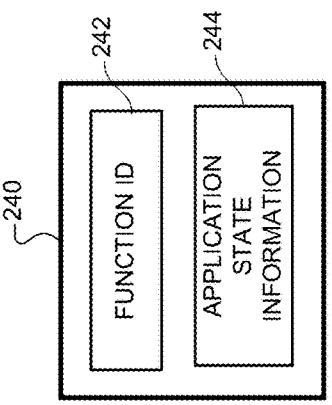

PROGRAMMATIC INSTALLATION AND NAVIGATION TO ACCESS DEEP STATES OF UNINSTALLED APPLICATIONS

CROSS-REFERENCE TO RELATED APPLICATIONS

The present application is a continuation of U.S. patent application Ser. No. 14/630,782 filed on Feb. 25, 2015, which claims the benefit of U.S. Provisional Application No. 61/944,497, filed on Feb. 25, 2014, and U.S. Provisional Application No. 62/093,509, filed on Dec. 18, 2014. The entire disclosures of the applications referenced above are incorporated by reference.

FIELD

This disclosure relates to displaying search results in multiple viewing modes.

BACKGROUND

Search engines can be utilized in many different fields. Search engines can be used to identify content on the World Wide Web (the "Web"), identify applications, or identify functionalities across the Web and a collection of applications. When a search engine receives a search query it provides search results which link to resources. The user can click on a search result to access a resource. For example, the user can click on a search result to access a web page indicated by the search results.

SUMMARY

One aspect of the disclosure provides a method. The method includes receiving, by a processing device of a user device, search results containing one or more result objects from a search engine, displaying, by the processing device, displayed search results in a graphical user interface based on the one or more results objects, receiving, by the processing device, a selection of the resize element by a user via a user interface of the user device and modifying, by the processing device, the modifiable search result based on the selection of the resize element. Each result object contains data and instructions to render a respective displayed search result. The displayed search results include a modifiable search result displayable in a collapsed viewing mode and an expanded viewing mode. The modifiable search result indicates a third party application and includes a resize element displayed in relation to the modifiable search result. The resize element is a graphical user interface element that when selected, causes modification of the modifiable search result.

Implementations of the disclosure may include one or more of the following optional features. In some implementations, displaying the displayed search result includes rendering and presenting the modifiable search result in the collapsed viewing mode and modifying the modifiable search result includes rendering and presenting the search result in the expanded viewing mode in response to the user selection. The method may further include requesting real-time data from a third party resource associated with the third-party application based on reference data included in the result object used to render the modifiable search result in response to the selection of the resize element. Additionally or alternatively, modifying the modifiable display search results may include rendering the modifiable search result in the expanded viewing mode, binding the real time data to the modifiable search result and presenting the modifiable search result with the real-time data.

In some examples, when the modifiable search result is in the expanded viewing mode, the modifiable search result includes one or more input elements that receive user input. Additionally or alternatively, the method may further include receiving, by the processing device, user input in the one or more input elements via the user interface of the user device, obtaining, by the processing device, an access mechanism based on the values input into the one or more input elements and accessing, by the processing device, the state of the third-party application using the access mechanism. Each input element may respectively receive a value associated with a parameter type. The access mechanism may be configured to access a state of the third-party application that depends on the values input into the one or more input elements.

In some implementations, obtaining the access mechanism includes retrieving a template for generating the access mechanism from the result object and generating the access mechanism based on the template and the values input into the one or more input elements. Obtaining the access mechanism may further include transmitting a request for the access mechanism to the search engine and receiving the access mechanism from the search engine. The request may include values input into the one or more input elements. The result object may include a first layout portion that defines a collapsed viewing mode representation of the search result, a second layout portion that defines an expanded viewing mode representation of the search result, and a flag indicating whether to render the search result according to the first layout portion and the second layout portion. Displaying the search result may be based on the flag.

Another aspect of the disclosure provides a user device. The user device includes a user interface device, a storage device, a network interface device and a processing device. The processing device executes computer readable instructions that when executed cause the processing device to receive search results containing one or more result objects from a search engine, render and present, by the processing device, the displayed search results in a graphical user interface displayed based on the one or more result objects, receiving a user selection of the resize element via the user interface device and modify the modifiable search result based on the selection of the resize element. Each result object contains data and instructions to render a displayed search result. The displayed search results include a modifiable search result displayable in a collapsed viewing mode and an expanded viewing mode. The modifiable search result indicates a third party application and includes a resize element displayed in relation to the modifiable search result. The resize element is a graphical user interface element, that when selected, causes modification of the modifiable search result.

In some examples, displaying the displayed search result by rendering and presenting the modifiable search result in the collapsed viewing mode and modifying the modifiable search result includes rendering and presenting the search result in the expanded viewing mode in response to the user selection. The computer readable instructions, when executed, may further cause the processing device to transmit a request for real-time data to a third-party resource associated with the third-party application based on reference data included in the result object used to render the modifiable search result in response to the selection of the resize element. Modifying the modifiable display search result may include rendering the modifiable search result in the expanded viewing mode, binding the real time data to the modifiable search result and presenting the modifiable search result with the real-time data. When the modifiable search result is in the expanded viewing mode, the modifiable search result may include one or more input elements that receive user input.

In some examples, the user device is further configured to receive user input in the one or more input elements via the user interface of the user device, obtain an access mechanism based on the values input into the one or more input elements, and access the state of the third-party application using the access mechanism. Each input element respectively receives a value associated with a parameter type. The access mechanism may be configured to access a state of the third-party application that depends on the values input into the one or more input elements. Obtaining the access mechanism may include retrieving a template for generating the access mechanism from the result object and generating the access mechanism based on the template and the values input into the one or more input elements.

Obtaining the access mechanism may further include transmitting a request for the access mechanism to the search engine and receiving the access mechanism from the search engine. The request includes the values input into the one or more input elements. The result object may include a first layout portion that defines a collapsed viewing mode representation of the search result, a second layout portion that defines an expanded viewing mode representation of the search result, and a flag indicating whether to render the search result according to the first layout portion and the second layout portion. Displaying the search result may be based on the flag.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

FIG. 1C illustrates an example of a user device displaying search results including a displayed search results that receives user input.

FIG. 1D illustrates an example of a user device executing a native application in response to selection of the displayed search result of FIG. 1C.

FIG. 1G illustrates an example of a user device displaying search results including a modifiable displayed search results being displayed in a collapsed viewing mode.

FIG. 1H illustrates an example of a user device displaying search results including a modifiable displayed search results being displayed in a collapsed viewing mode.

FIG. 2B is a schematic illustrating an example search engine.

FIGS. 2C and 2D are schematics illustrating example components of a function record and a result object record, respectively.

Like reference symbols in the various drawings indicate like elements.

DETAILED DESCRIPTION

Figure 1A:
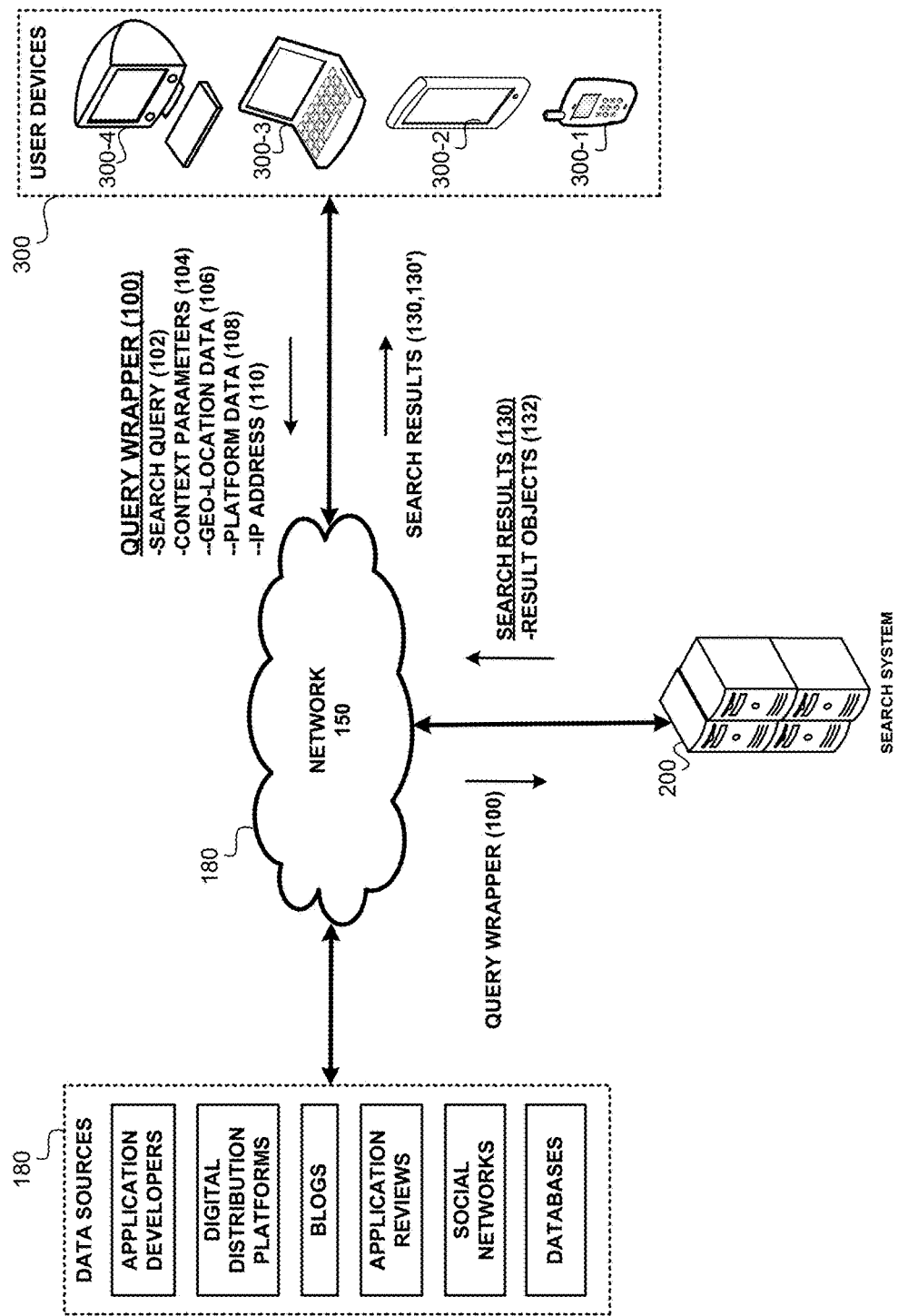
FIG. 1A is a schematic illustrating an example environment of a search engine that receives search queries from user devices.
Figure 1B:
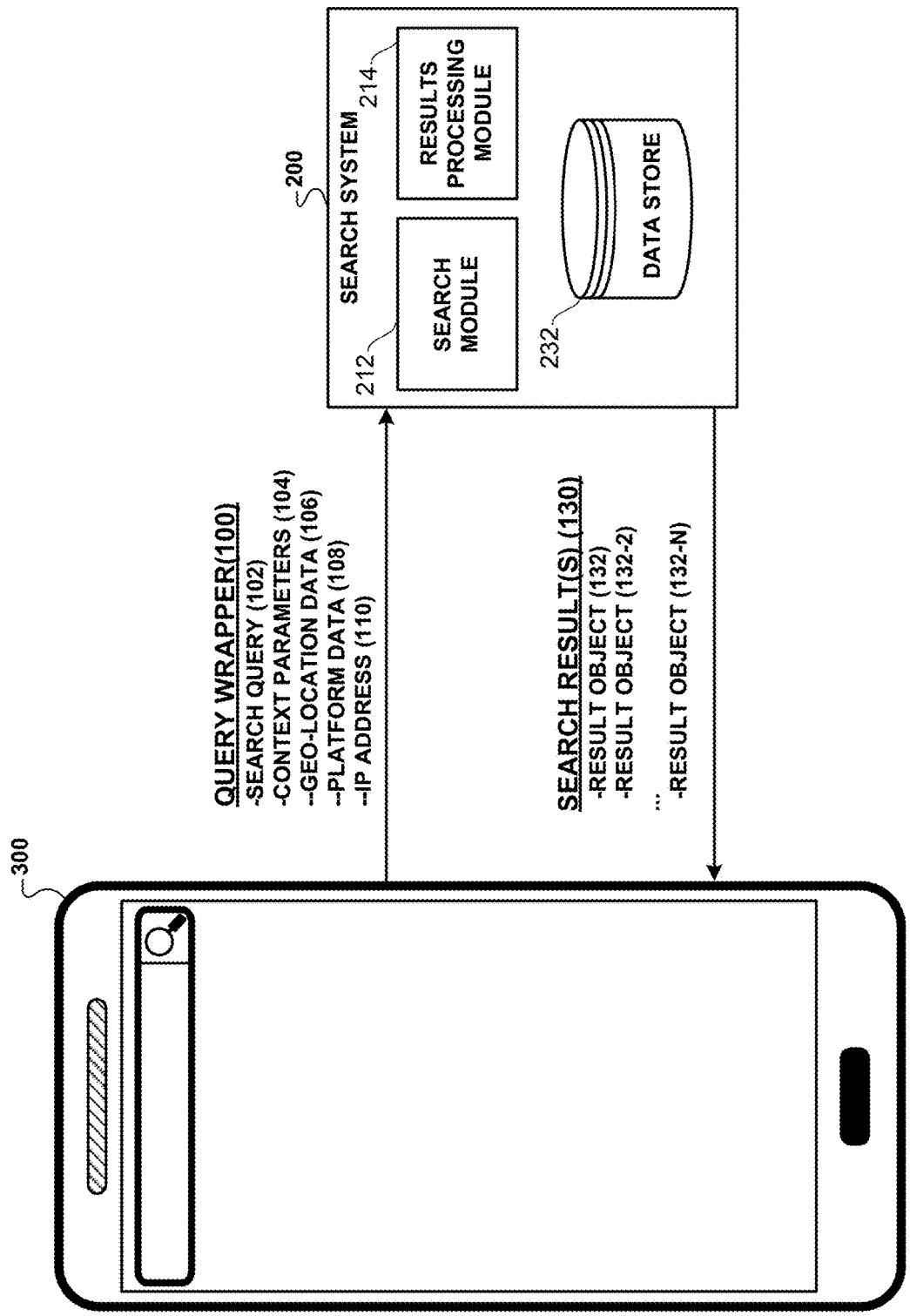
FIG. 1B is a schematic illustrating an example user device in communication with a search engine.

FIG. 1A illustrates an example environment 10 of a search engine 200. A search engine 200 is a collection of one or more computing devices that receives search queries 102 from user devices 300 via a network 150. A user device 300 can be any suitable user computing device including, but not limited to, a smartphone 300-1, a tablet computing device 300-2, a personal computing device 300-3, a laptop computing device 300-4, a gaming device, a vehicle infotainment device, and/or a smart appliance (e.g., smart refrigerator or smart television).

The search engine 200 may perform any suitable type of searches. For example, the search engine 200 may perform web searches (e.g., for content found on websites), application searches (e.g., for applications having particular attributes), and/or function searches (e.g., for specific states of either native or web applications). For purposes of explanation, reference is made to a search engine 200 that performs function searches, whereby the search engine 200 identifies states of applications that are relevant to the search query 102. The search engine 200 may perform other types of searches, while performing the function searches and the search results 130 may indicate the results of the other searches as well.

According to implementations of the present disclosure, the search results 130 can be rendered to include input elements, whereby users can provide user input into the individual displayed search results. In order to facilitate more options to the users, the individual displayed search results may be displayed in different viewing modes (e.g., collapsed and expanded viewing modes). In this way, a user can expand a displayed search result in order to provide additional input into the displayed search result. Upon selection of the displayed search result, the user device 300 can access a state of the software application using the value(s) entered into the displayed search result.

A software application can refer to a software product that causes a computing device to perform a function. In some examples, a software application may also be referred to as an "application," "an app," or a "program." Example software applications include, but are not limited to, productivity applications, social media applications, messaging applications, media streaming applications, social networking applications, and games. Software applications can perform a variety of different functions for a user. For example, a restaurant reservation application can make reservations for restaurants. As another example, an internet media player application can stream media (e.g., a song or movie) from the Internet. In some examples, a single software application can provide more than one function. For example, a restaurant reservation application may also allow a user to retrieve information about a restaurant and read user reviews for the restaurant in addition to making reservations. As another example, an internet media player application may also allow a user to perform searches for digital media, purchase digital media, generate media playlists, and share media playlists. The functions of an application can be accessed using editions of the software application (e.g., native application editions of the software application and/or web application editions of the software application).

A state of a software application can refer to a parameterized function of the software application. A software application can perform one or more functions. A function is a service of the software application that can be accessed by a user device 300 via an edition of the software application. Non-limiting examples of functions can include "making a restaurant reservation" (which may parameterized with a restaurant identifier, a date, and a time), "searching for a cuisine (which may be parameterized with a cuisine type and a location) "view flight prices" (which may be parameterized with departure and arrival airport codes, arrival and departure dates, and round trip flags), "request a driver" (which may be parameterized with a pick-up location), and "view a file" (which may be parameterized with a file identifier). A state of a software application can be accessed from a user device using an edition of the software application. In some scenarios, the performance of a function of a software application results in a state of the software application being accessed. An operating system of a user device 300 can instruct an edition of a software application to access a state of the software application using one or more access mechanisms. The access mechanisms can be used to launch native application editions and/or web application editions of the software application.

A native application edition (or "native application") is a version of a software application that is, at least in part, installed on a user device 300. In some scenarios, a native application is installed on a user device 300, but accesses an external resource (e.g., an application server) to obtain data from the external resource. For example, social media applications, weather applications, news applications, and search applications may respectively be accessed by one or more native application editions that execute on various user devices 300. In such examples, a native application can provide data to and/or receive data from the external resource while accessing one or more functions of the software application. In other scenarios, a native application is installed on the user device 300 and does not access any external resources. For example, some gaming applications, calendar applications, media player applications, and document viewing applications may not require a connection to a network to perform a particular function. In these examples, the functionality of the software product is encoded in the native application editions itself. The native application edition is able to access the functions of the software application without communicating with any other external devices.

A web application edition (or a "web application") is a version of a software application that may be partially executed by a remote computing device (e.g., a web server or application server) at the request of user device 300 (e.g., by a web browser of the user device 300). For example, a web application may be an application that is executed, at least in part, by a web server and accessed by a web browser (e.g., a native application) of the user device 300. Example web applications may include, but are not limited to, web-based email, online auctions websites, social-networking websites, travel booking websites, and online retail websites. A web application accesses functions of a software product via a network. Example implementations of web applications include webpages and/or HTML-5 application editions.

In some scenarios, a software application may be accessed by one or more native application editions of the software application and/or one or more web application editions of the software application. In these scenarios, there may be overlap between the states that the native application edition(s) can access and the states that the web application edition can access. For example, a restaurant review application may have reviews of thousands of restaurants and may also provide an on-line ordering function from some of the restaurants. The restaurant review application may be accessed by a first native application edition configured for a first operating system (e.g., the ANDROID operating system maintained by Google, Inc.), a second native application edition configured for a second operating system (e.g., the IOS operating system developed by Apple, Inc.), and a web application edition (e.g., a website) of the restaurant review application. The restaurant review application may allow all the editions (native and web) to access the various reviews of restaurants but may only allow on-line orders to be placed using the native application editions. In this way, some states of the restaurant review application cannot be accessed by the web application edition but there is overlap between the states that can be accessed by the native application editions and the web application edition.

In general, the user device 300 may communicate with the search engine 200 using any application that can transmit search queries 102 to the search engine 200. In some examples, the user device 300 runs a native application that is dedicated to interfacing with the search engine 200 (e.g., a search application 312). In some examples, the user device 300 communicates with the search engine 200 using a more general application, such as a web application accessed using a web browser native application. Although the user device 300 may communicate with the search engine 200 using the native search application 312 and/or a web-browser application, the user device 300 may be described hereinafter as using the native search application 312 to communicate with the search engine 200. In some implementations, the functionality attributed to the search application 312 may be included as a searching component of a larger application that has additional functionality. For example, the functionality attributed to the search application 312 may be included as part of a native application or a web application as a feature of another application that provides search capabilities. Furthermore, while the search engine 200 is described as receiving search queries 102 from one or more user device(s) 300 via a network, the search engine 200 may be configured to receive the search queries 102 from user devices 300 via a partner device (not shown). A partner device may belong to a company or organization other than that which operates the search engine 200 (e.g., an internet search providers, wireless communications service providers, or third-party search providers). The partner device can route the search query 102 to the search engine 200 on behalf of the user device 300. Thus, in such scenarios, the search engine 200 ultimately receives the search query 102 from a user device 300, even when by way of a partner device. Similarly, the search engine 200 ultimately transmits the search results to the user device 300, even when by way of the partner device.

A user device 300 transmits a search query 102 to the search engine 200, which processes the search query 102 and generates search results 130 based thereon. A search query 102 can refer to a set of one or more query terms. A query term is a string of one or more characters (e.g., letters, number, and/or symbols). In some implementations, the user device 300 transmits the search query 102 in a query wrapper 100. A query wrapper 100 is a transmittable data structure that stores the search query 102. The query wrapper 100 can contain additional information, which may be referred to as context parameters 104. Examples of context parameters 104 include geolocation data 106 that indicates a geolocation of the user device 300 at a particular time, platform data 108 that indicates an operating system type of the user device 300, an IP address 110 that indicates an IP address of the user device 300, and any other suitable data (e.g., a username of a user associated with the user device 300).

The search engine 200 generates search results 130 based on a search query 102 (and in some cases one or more context parameters 104) and provides the search results 130 to a requesting user device 300. According to some implementations, the search engine 200 identifies one or more states of one or more respective software applications that are relevant to the search query 102. For instance, in response to the search query 102 "call a cab," the search engine 200 identifies various states of applications that can help a user make a taxi reservation.

The search engine 200 generates search results 130 that are indicative of the identified states of software applications. The user device 300 renders the search results 130 into displayed search results 130'. The search results 130 can include one or more result objects 132. In some implementations, each result object 132 represents a single search result 132'. A result object 132 can include an encoded search result, which can define search result data (e.g., text, images, and instructions). In some implementations, a result object includes data and instructions which the user device 300 utilizes to render the displayed search result 132'. The data and instructions may define the layout of displayed search result 132' as well as the look and feel of the displayed search result (e.g., fonts, font sizes, styles, colors, etc.). Alternatively, the result object may include a pointer that identifies a layout file stored at the user device 300, whereby the stored layout file defines the layout of the displayed search result 132' as well as the look and feel thereof. The user device 300 renders a displayed search result 132' using the search result data defined by the encoded search result. For purposes of explanation, reference to a "search result" can include reference to an encoded search result or a displayed search result 132'. Put another way, before a search result has been rendered, the term "search result" references an encoded search result, and after rendering references a displayed search result resulting from the encoded search result.

A result object 132 can include any suitable search result data. For example, a result object 132 can include display data, access mechanism data, GUI data, instructions, referential data, a result score, and layout data. A result object 132 may include any combination of the above-identified data, as well as additional or alternative data. The individual types of data that may be found in a result object 132 are described in greater detail below.

A displayed search result 132' can link a user to a state of an application. In these implementations, the displayed search results 130' are a collection of user selectable links, whereby the user selectable links link the user to one of a plurality of applications or a thereof that are relevant to the search query 102. A user selectable link can include one or more access mechanisms. Examples of access mechanisms include, but are not limited to, native application access mechanisms (hereinafter "application access mechanism"), web access mechanisms, application download access mechanisms, and/or scripts. A user device 300 uses an access mechanism to access functionality of an application. An access mechanism can provide access to a default page of an application (e.g., a home page) or a deeper state of the application.

An application access mechanism may be a string that includes a reference to a native application (e.g., one of native applications) and indicates one or more operations for the user device 300 to perform. If a user selects a user selectable link including an application access mechanism, the user device 300 may launch the native application referenced in the application access mechanism and perform the one or more operations indicated in the application access mechanism. In some implementations, any combination of the operating system of the user device 300, a search application executed by the user device 300, a native application executed by the user device 300, and/or a web browser executed by the user device 300 can launch the native application referenced in the application access mechanism A web access mechanism may include a resource identifier that includes a reference to a web resource (e.g., a page of a web application/website). For example, a web access mechanism may refer to a uniform resource locator (URL) (i.e., a web address) used with hypertext transfer protocol (HTTP). An example web access mechanism for an application called "exampleapp" may be "www.exampleapp.com/search?desc=mexican&loc=detroit &MI." If a user selects a user selectable link including a web access mechanism, the user device 300 may launch the web browser application and retrieve the web resource indicated in the resource identifier. An application download access mechanism may indicate a location (e.g., a digital distribution platform) where a native application can be downloaded in the scenario where a native application edition of the application is not installed on the user device 300. If a user selects a user selectable link including an application download access mechanism, the user device 300 may access a digital distribution platform from which the referenced native application edition may be downloaded. A script is a set of instructions, that when executed by the user device 300 cause the user device to access a resource indicated by the script. For example, the script may instruct an operating system of the user device 300 to launch the native application, and may define one or more additional instructions to access a particular state of the application. A script may be used instead of another type of access mechanism when an application is not configured to be referenced by the other types of access mechanisms.

In some scenarios, the search results 130 include individual search results 132 that define one or more input elements. When the user device 300 renders a search result 132 defining one or more input elements, the displayed search result 132' includes one or more input elements. An input element can refer to a GUI element that receives a value from a user via the user interface of the user device 300, whereby the value entered into an input element maps to one of a set of input parameters that are received by the displayed search result 132. When the user device 300 renders and displays a displayed search result 132', the displayed search result 132' can receive and display the value in an area of the displayed result 132' defined by the input element. Examples of input elements can include, but are not limited to, text input element, drop-down menus, calendar input elements, radio button input elements, and slider input elements. When the user enters one or more values into respective input elements of a displayed search result 132' and selects the displayed search result 132' (e.g., presses an execution element), the user device 300 accesses a state of an application indicated by the search result that is based on the one or more values. In this way, the displayed search result 132' is a user selectable link that receives input from a user. In some implementations, the user device 300 utilizes an access mechanism that is indicative of the one or more values to access the state of the software application indicated by the displayed search result 132. The user device 300 can receive, request, and/or generate the access mechanism, examples of which are displayed in greater detail below.

FIG. 1C illustrates an example of displayed search results 130'. In some scenarios, the search engine 200 responds to a search query 102 with search results 130, that when rendered by the user device 300, include one or more displayed search results 132' that include one or more input elements 134. In the illustrated example, the displayed search results 130' are in response to the search query 102 "vacation." The displayed search results 130' include a displayed search result 132'-1 that allows the user to access a hotel booking functionality of the HIPMUNK application by Hipmunk, Inc. In this example, the example displayed search result 132'-1 includes a text input element 134-1 that allows the user to enter a location, a calendar input element 134-2 that allows the user to enter check-in and check-out dates, a first drop-down menu input element 134-3 that allows the user to select a number of rooms, and a second drop-down menu input element 134-4 that allows the user to select a number of guests. The user can input various values into the respective input elements and select (e.g., press upon) a selection box 136-1, thereby selecting the displayed search result 132'-1.

In response to the user selection of the displayed search result 132'-1, the user device 300 launches the HIPMUNK application and provides the values inputted into the input elements to the HIPMUNK application. As will be discussed, the user device 300 can provide the values to an application in a number of different manners. For example, the user device 300 can utilize an access mechanism that is based on the values entered into the displayed search result 132'-1 to access a state of the HIPMUNK application that is based on the inputted values. Additionally or alternatively, the user device 300 can launch a native application edition (or a web-application edition) of the HIPMUNK application and can enter the values inputted by the user into a graphical user interface displayed by the native application. In FIG. 1D, the user device 300 has launched, and is executing, the HIPMUNK application in response to the user selecting the displayed search result 132'-1 displayed in FIG. 1C. In this example, the user device 300 enters the values provided by the user into the displayed search result 132-1 of FIG. 1C into the graphical user interface of the HIPMUNK native application. In this way, selection of the displayed search result 132-1 allows the user to access the hotel reservation function of the HIPMUNK application.

In some scenarios, a displayed search result 132' can link to multiple functionalities of a software application. FIG. 1E (and of FIG. 1C) illustrates an example of a displayed search result 132'-1 that can link to multiple functionalities of an application. In this example, the user has selected the flight tab 138-2 to link to the flight reservation function of the HIPMUNK application instead of the hotel reservation function of the HIPMUNK application. In the illustrated example, the flight tab includes first and second input elements 134-5, 134-6 that respectively allow a user to enter a departure airport and an arrival airport. The flight tab 138-2 of the displayed search result 132-1 further includes a calendar input element 134-7 that allows a user to enter departure and return dates, as well as a drop down menu 134-8 that allows the user to enter a number of travelers. The user can access the flight reservation functionality of the HIPMUNK application by selecting the "search flights" selection element 136-2.

Figure 1F:
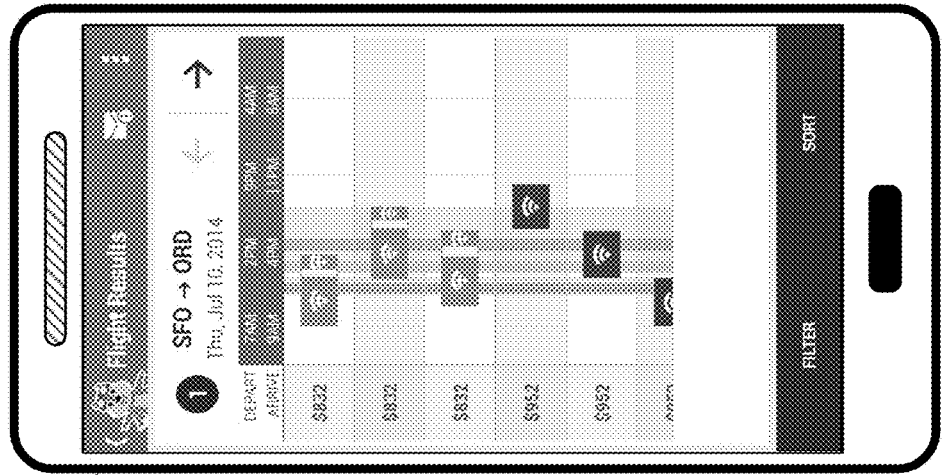
FIG. 1F illustrates an example of a user device executing a native application in response to selection of the displayed search result of FIG. 1E.
Figure 1E:
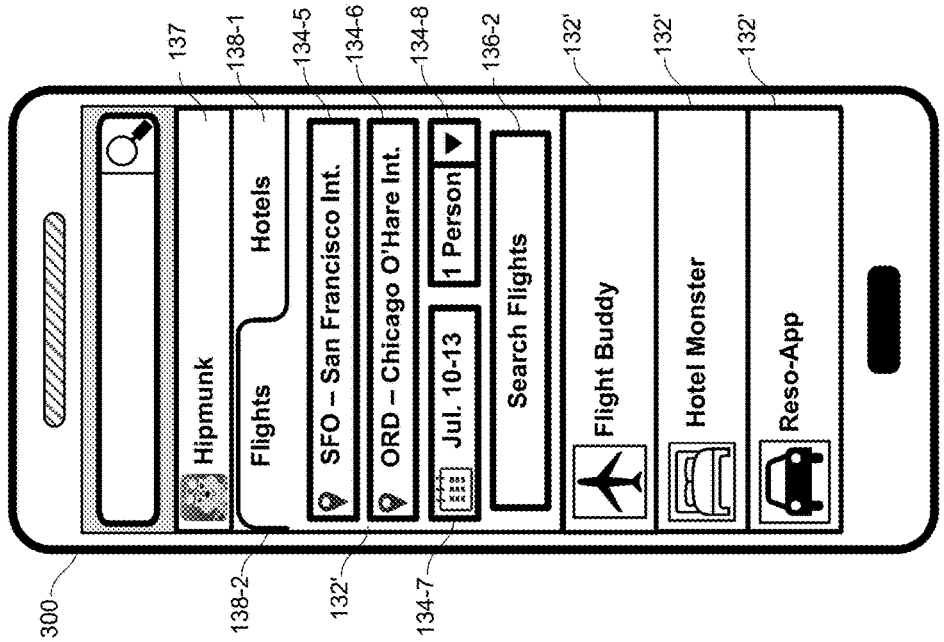
FIG. 1E illustrates an example of a user device displaying search results including a displayed search results that receives user input.

In FIG. 1F, the user device 300 has launched the native application edition of the HIPMUNK application and has accessed a state of the HIPMUNK application that displays available flight options given the values input by the user into the displayed search result 132-1. In this example, the user device 300 may have utilized an application access mechanism that is based on the inputted values to access the state of the HIPMUNK application. In this way, the user device 300 is able to directly access this state from the SERP based on the values entered into the input elements 134 of the displayed search result 132'. The user device 300 may obtain the application access mechanism in a number of different manners. For example, the user device 300 may request the application access mechanism from the search engine 200 upon user selection of the selection element 136 or may generate the application access mechanism based on the inputted values. In another example, the user device 300 may utilize a set of instructions for generating access mechanisms for a particular application given a set of parameter types. In other implementations, the user device 300 can behave in a manner similar to the examples of FIGS. 1C and 1D, whereby the user device 300 launches the application and inputs the parameters into a GUI of the native application.

Referring now to FIG. 1G and 1H, one issue that arises with mobile user devices 300 (e.g., tablets and smartphones) is that screen space is limited. Thus, in some implementations, one or more of the displayed search results 132' can be viewed in two or more viewing modes. For example, a displayed search result 132' can be displayed in a collapsed viewing mode and in an expanded viewing mode. In these implementations, a displayed search result 132' that can be viewed in different modes (e.g., collapsed and expanded) may include a resize element 139. A resize element 139 is a GUI element that when selected by a user, causes the displayed search result 132' to toggle to another viewing mode. For example, selection of the resize element 132 when the displayed search result 132' is presented in collapsed viewing mode (e.g., FIG. 1G), may cause the user device 300 to toggle the displayed search result 132' to an expanded viewing mode. Similarly, when a displayed search result 132' is presented in an expanded viewing mode (e.g., FIG. 1H), selection of the resize element 139 causes the displayed search result 132' to toggle to a collapsed viewing mode.

A collapsed viewing mode can refer to a mode where a displayed search result 132' imparts a limited amount of data. For example, in a collapsed viewing mode, the displayed search result 132' may display a name of the application and a resize element 132. Furthermore, in the collapsed viewing mode, the displayed search result 132' may include a limited amount of text (e.g., a brief description of the application). In the example of FIG. 1G, the displayed search result 132'-2 corresponding to an example application called "Travel Zoom" is displayed in a collapsed viewing mode. In the illustrated example, the displayed search result 132'-2 presents a limited amount of information (e.g., an application name) and a resize element 139. In some implementations, the displayed search result 132'-2 may act as a user selectable link, whereby when the user selects the displayed search result 132'-2 in the collapsed viewing result, the user device 300 launches the Travel Zoom application (e.g., native or web) to a default state (e.g., a home screen). In other implementations, the displayed search result 132'-2 must be expanded in order for the displayed search result 132'-2 in order to link to the indicated application.

When the user selects the resize element 139-2, the user device 300 toggles the displayed search result 132-2 to an expanded viewing mode (e.g., FIG. 1H). An expanded viewing mode can refer to a mode where the displayed search result 132' provides additional information or functionality. In an expanded viewing mode, the displayed search result 132' can include input elements 134, as well as more information, such as a description of a software application, a rating of the software application, a description of a state of the software application, a function of the software application that may be leveraged using the displayed search result, or any other suitable information. Furthermore, in an expanded viewing mode, a displayed search result 132' can include two or more tabs, as was discussed above. In the example of FIG. 1H, the displayed search result 132-2 corresponding to the Travel Zoom application is displayed in an expanded viewing mode. In this example, the displayed search result 132'-2 includes multiple input elements 134 that allow the user to enter values corresponding to various input parameters (e.g., location, check-in/checkout dates, number of rooms, and number of guests). The user can enter values into the respective input elements 134 and select the selection element 136 to launch the Travel Zoom application to a state corresponding to the inputted values, as was described with respect to FIGS. 1C-1F. Furthermore, the displayed search result 132-2 includes a resize element 139-2. When in an expanded mode, selection of the resize element 139-2 causes the user device 300 to toggle the displayed search result 132'-2 into a different viewing mode (e.g., collapsed viewing mode of FIG. 1G). In some implementations, an expanded displayed search result 132' includes a header section 137. In these implementations, the header 137 may be a user selectable link to a default state of the application. For example, selection of the Travel Zoom header 137 can cause the user device 300 to launch the Travel Zoom application to a default state (e.g., a home screen of the Travel Zoom application).

In some implementations, a displayed search result 132' may further display real-time data. Real-time data can refer to information that is apt to change. For example, a restaurant reservation application may have a user interface that allows a user to select from a plurality of different available reservation times for a restaurant. In such an example, the available restaurant times may be viewable in an expanded viewing mode, but not in a collapsed viewing mode. Initially, the displayed search result 132' may be displayed in a collapsed viewing mode. When the user selects a resize element 139 to expand the displayed search result 132' into an expanded viewing mode, the user device 300 can request the data from an external resource (e.g., the search engine 200 or a server affiliated with the restaurant reservation application). In this way, the user device 300 does not receive the real-time data unless the user wishes to view the real-time data.

FIGS. 2A-2F illustrate an example search engine 200 and data flows thereof. In the illustrated example of FIG. 2A, the search engine 200 includes, but is not limited to a processing device 210, a storage device 230, and a network interface device 280. In some implementations, the search engine 200 may be incorporated in a larger search system (not shown) that includes an advertising engine and/or other engines. For purposes of discussion, the search engine 200 is described as performing functional searches. Although the techniques described herein may be applied to other suitable searches.

The processing device 210 can include memory (e.g., RAM and/or ROM) that stores computer executable instructions and one or more processors that execute the computer executable instructions. In implementations of two or more processors, the processors can operate in an individual or distributed manner. In these implementations, the processors can be arranged in a single computing device or across multiple computing devices (e.g., rack-mounted servers). The processing device 210 can execute a search module 212 and a results processing module 214.

The network interface 280 includes one or more devices that can perform wired or wireless (e.g., Wi-Fi or cellular) communication. Examples of the network interface device 280 include, but are not limited to, a transceiver configured to perform communications using the IEEE 802.11 wireless standard, an Ethernet port, a wireless transmitter, and a universal serial bus (USB) port.

The storage device 230 can include one or more computer readable storage mediums (e.g., hard disk drives and/or flash memory drives). The storage mediums can be located at the same physical location or at different physical locations (e.g., different servers and/or different data centers). In the illustrated example, the storage device 230 stores a data store 232. The data store 232 may include one or more databases, indices (e.g., inverted indices), tables, files, or other data structures which may be used to implement the techniques of the present disclosure. The data store 232 stores function records 240 and result object records 250. While reference is made to a single data store 232, the function records 240 and result object records 250 may be stored in separate data stores 232. The storage device 230 may store any other suitable data stores.

FIG. 2B illustrates an example data flow of the search engine 200 according to some implementations of the present disclosure. In the illustrated example, the search module 212 receives a query wrapper 100 that contains a search query 102. The search module 212 searches the function records 240 stored in the data store 232 to identify a set of function identifiers 242 that are relevant to the search query 102. The search module 212 scores the function records 240, and outputs a set of scored function identifiers 242 to the results processing module 214. The scored function IDs 242 respectively represent the scored function records 240. Additionally or alternatively, the search module 212 can be configured to output actual function records 240.

FIG. 2C illustrates an example of a function record 240. Each function record 240 may include data related to a function of an application and/or the state of the application resulting from performance of the function. A function record 240 may include a function identifier 242 (referred to as a "function ID") and application state information 244. The function records 240 can contain additional types of data not explicitly discussed without departing from the score of the disclosure.

A function ID 242 can identify a function record 240 among the other function records 240 included in the function record data store 230. Furthermore, a function ID 242 can identify a state of a software application and can be used to generate one or more access mechanisms for accessing the state. A function ID 242 is a string of alphabetic, numeric, and/or symbolic characters (e.g., punctuation marks) that uniquely identifies the state of the application. In some implementations, a function ID 242 can be in the format of a resource identifier. For example, the function ID 242 may be a uniform recourse locator (URL) or an application resource identifier. In these implementations, the function ID 242 may be used by a user device to access a software application via a web application edition or one or more native application editions of the software application, respectively. In some implementations, a function ID 242 can map to one or more access mechanisms. In these implementations, a function ID 242 may map to a web resource identifier (e.g., a URL), one or more application resource identifiers, and/or one or more scripts. For instance, a state of an example software application, "exampleapp," may be accessed via a web application edition and two native application editions (e.g., an edition configured for the ANDROID operating system and an edition configured for the WINDOWS PHONE operating system). In this example, the web resource identifier may be:
www.exampleapp.com/param1=abc¶m2=xyx, the first application resource identifier may be
android.exampleapp::param1=abc¶m2=xyx, and the second application resource identifier may be
windows.exampleapp::param1=abc¶m2=xyx. In this example, a function ID 242 may map to the web resource identifier and the two application resource identifiers. A function ID 242 may have a URL-like structure that utilizes a namespace other than http://, such as "func://" which indicates that the string is a function ID 242. In the example of "exampleapp" above, the function ID 242 corresponding to the example state may be: func://exampleapp::param1=abc¶m2=xyx, which maps to the access mechanisms described above. In another example, a function ID may take the form of a parameterizable function. For instance, a function ID may be in the form of "app_id[action(parameter_1, . . . , parameter_n)]", where app_id is an identifier (e.g., name) of a software application, action is an action that is performed by the application (e.g., "view menu"), and parameter_1 . . . parameter_n are n parameters that the software application receives in order to access the state corresponding to the action and the parameters. Drawing from the example above, a function ID 242 may be "exampleapp[example_action(abc, xyz)]". Given this function ID 242 and the referencing schema of the example application, the foregoing function ID 242 may be used to generate the access mechanisms defined above. Additionally or alternatively, the above example function ID 242 may map to the access mechanisms defined above. Furthermore, while function IDs 242 have been described with respect to resource identifiers, a function ID 242 may map to one or more scripts that access a state of a software application or may be utilized to generate one or more scripts that access a state of the software application. It is noted that some software applications may have a common scheme for accessing all of their respective native application editions. In such scenarios, a single application resource identifier may access multiple application editions.

In some scenarios, a function ID 242 may be unparameterized, such that the function ID 242 may be parameterized based on input parameters provided by a user. In these scenarios, the function ID 242 can identify the application, the action, and the parameters that the function ID receives, but the parameters are not assigned any values. For example, an unparameterized function ID 242 corresponding to the exampleapp may take the form: exampleapp[example_action(param_1, param_2)]. In the example of making a taxi reservation on the SuperTaxi software application, an unparameterized function ID may take the form: SuperTaxi[request_taxi(pickup_location, drop_off_location, time). In this way, the function ID can be parameterized with values provided by the user (e.g., in a displayed search result 132'). The parameterized function ID 242 can be used to generate access mechanisms for accessing a state of the SuperTaxi application that depends on the inputted parameter values. Unparameterized function IDs 242 may be used to identify a function record 240 of a state of a software application that receives input parameters from a user (e.g., a state where a user can make flight reservations, search for a type of cuisine, or request a taxi). Additionally or alternatively, unparameterized function IDs 242 may be used to generate parameterized function IDs when a user inputs one or more values into an application card 132 and selects the application card 132.

The application state information 244 may include data that describes features of a state to which the function record 240 corresponds. The application state information 244 may include a variety of different types of data. The application state information 244 may include structured, semi-structured, and/or unstructured data. In some implementations, the search engine 200 may extract and/or infer the application state information 244 from documents retrieved from various data sources. For example, the search engine 200 may crawl various data sources 180 (FIG. 1A) such as digital distribution platforms, websites of application developers, reviews of applications, the applications themselves (native applications and/or web applications), and any other suitable data sources 180 to obtain the application state information 244. Additionally or alternatively, the application state information 244 may be human curated. In some examples, the application state information 244 may include data that an application presents to a user when the application is set to an application state defined by an access mechanism. For example, if the function record 240 is associated with a shopping application, the application state information 244 may include data that describes a product (e.g., product name, product seller, product description, and prices) that are shown when the shopping application is set to a particular state application state. As another example, if the function record 240 is associated with a music player application, the application state information 244 may include data that describes a song (e.g., name of the song, album of the song, artist, reviews of the song, etc.) that is played when the music player application is set to a particular application state. Furthermore, the application state information 244 may include information that describes the application itself. For example, the application state information 244 may include a name of the application, a developer of the application, and the platforms for which the application is developed (e.g., web-based, IOS, ANDROID, FIRE OS, etc.).

In some scenarios, the application state information 244 describes features of a function of the application when set to a particular state. In some implementations, the application state information 244 can include a description of the function. Put another way, the application state information can define a broad action, synonyms of the broad action, and terms that may be associated with the broad action. For example, if a function record 240 corresponds to a flight reservation functionality, the application state information 244 may include "make flight reservations" as a broad action, synonyms of the broad action (e.g., "buy plane tickets," "search flights," etc.), and terms or phrases associated typically associated with the broad action (e.g., "flights," "vacation," "travel to," airport codes, city names, country names, etc.). In another example, a function records 240 corresponding to a restaurant searching functionality of an application may include a broad action "find a restaurant," synonyms of the broad action (e.g., "search restaurants," "find food," etc.), and terms associated with the broad action (e.g., restaurant cuisines, city names, etc.).

The types of data included in the application state information 244 may depend on the type of information associated with the application state and the functionality of the application. In one example, if the function record 240 is for an application that provides reviews of restaurants, the application state information 244 may include information (e.g., text and numbers) related to a restaurant, such as a name of the restaurant, a category of the restaurant, actual reviews of the restaurant, ratings of the restaurant, an address of the restaurant, hours of operation of the restaurant, and a menu for the restaurant. As another example, if the function record 240 is for an application that plays music, the application state information 244 may include information related to a song, such as the name of the song, the artist, lyrics, and listener reviews and/or ratings. In some implementations, such data may be structured in predetermined fields to help facilitate the generation of result objects 132 that are transmitted in the search results 130.

In some implementations, the application state information 244 further includes what parameter types, if any, the application receives at a given state or when performing a particular function. For instance, if an application state corresponds to a travel application's flight booking functionality, the application state information 244 may include the following parameter types: a Boolean round trip parameter, a departure location (geolocation or a string designating an airport code), an arrival location (geolocation or a string designating an airport code), a departure date, a return date, an integer indicating a number of passengers, and a seat type (e.g., business class, first class, economy). In another example, if an application state corresponds to creating a calendar event functionality, the application state information 244 may include the following parameter types: a string indicating an event name, a time parameter indicating a start time, a time parameter indicating an end time, a string indicating guests or invitees, and a frequency parameter that indicates the days or dates to which the calendar event pertains (e.g., Monday thru Friday, the first of every month, etc.).

In some implementations, the application state information 244 from the function records 240 is indexed in one or more search indexes. In these implementations, keywords and combinations of keywords (e.g., n-grams of keywords) that appear in the application state information 244 are used to key the one or more search indexes. In a search index, each keyword or combination of keywords is associated with each of the function records 240 that contain the keyword or combination of keywords. In some of these implementations, the search index associates a keyword or combinations of keyword with the function IDs 242 of the function records 240 that contain the keyword or combination of keywords. In this way, the search index may be queried using a query term or combination of query terms. The search index outputs function IDs 242 of the function records 240 that contain the query term or combination of query terms. In some implementations, the search index may also contain index scores for each keyword or combination of keywords/function record 240 association. The index score can indicate a relative importance of the keyword or combination of keywords with respect to the state of the application represented by the function record 240. In some implementations the index scores are TF-IDF scores. When the search index outputs a function ID 242 of a function record 240, the search index may also output the index score of the function record 240 with respect to the keyword or combination of keywords that were used to query the search index.

Referring back to FIG. 2B, the search module 212 identifies a consideration set of function IDs 242 based on the search query 102 (and possibly one or more context parameters), as well as the features described in the application state information 244 of the function records 240 stored in the data store 232. The search module 212 determines a result score for each function record 240 in the consideration set. In some implementations, the search module 212 associates the result score of a function record 240 with the function ID 242 of the function record 240. In this way, the search module 212 generates a set of scored function IDs 242. The search module 212 outputs the scored function IDs 242 to the results processing module 214. It is noted that the search module 212 may additionally or alternatively output scored function records 240 to the results processing module 214, which can include the function IDs 242 of the output records.

The results processing module 214 receives the scored function IDs 242 and generates search results 130 based thereon. In some implementations, the results processing module 214 identifies one or more function IDs 242 to base a result object 132 on based on the result score. The results processing module 214 accesses the result object records 250 stored in the data store 232 to generate the result objects 132.

FIG. 2D illustrates an example result object record 250 according to some implementations of the present disclosure. In some implementations, each result object record 250 corresponds to a respective software application. In these implementations, a result object record 250 can define instructions and/or data that are used to generate a result object 132. The instructions and/or data can identify the software application to which the result object record 250 corresponds. Additionally, the instructions and/or data can be used to generate access mechanisms based on a function ID 242. The instructions and/or data can also indicate a layout file to be used to generate a displayed search result 132'. In the illustrated example, a result object record 250 can store an application identifier 251 ("application ID), display data 252, layout data 254, access mechanism data 256, and reference data 258. The result object record scope 250 can contain additional types of data not explicitly discussed without departing from the scope of the disclosure.

The application identifier 251 identifies the software application to which the result object record corresponds. The application identifier 251 can be in any suitable format. For example, the application identifier 251 can be the name of the software application or a value indicating the software application.

Display data 252 can include text data and image data. The text data can include any text to be included in a displayed search result 132'. For example, the text data can include, but is not limited to, a name of the software application and a description of one or more broad actions that are performed by the software application. In some implementations, the result object record 250 is organized, at least in part, according to the broad actions. For example, if an example application relates to movies (i.e., motion pictures), the broad actions or functions performed by the software application may include watching a trailer of a movie, finding a description of the movie, finding movie times and locations, and purchasing movie tickets. Thus, according to some implementations, the result object record 250 may be divided into portions that relate to watching the movie trailers, finding movie descriptions, etc. Thus, when a function ID defines a broad action such as "watch_movie_trailer," the display data 252 used to populate a result object 132 may be obtained from a portion of the result object record 250 pertaining to the broad action "watch movie trailers." The image data can include any images to be included in a displayed search result 132'. For example, the image data can include, but is not limited to, an application icon that represents the application, user interface images used for rendering the displayed search result 132' (e.g., images such as screenshots). Image data may also include animations and videos. Images may be generally related to the software application or may be specific to one or more broad actions. In the latter scenario, the image data may be defined in the portions specific to the one or more broad actions.

Access mechanism data 256 can include any suitable information relating to the one or more access mechanisms that the results processing module 214 includes in a result object 132. In some implementations, the access mechanism data 256 includes the access mechanisms that correspond to a function ID 242 or function record 240. Put another way, the access mechanism data 256 can include one or more access mechanisms to access a particular state of a software application. Additionally or alternatively, the access mechanism data 256 can include instructions for generating access mechanisms to access one or more states of the software application. For example, the access mechanism data 256 can include templates for generating an application resource identifier and/or web resource identifiers. Each template can define a namespace corresponding to an application edition to be accessed and a manner by which to arrange one or more values within the resource identifier given the parameter type of each value. For example, a template for accessing a flight miles calculator of a native application called "MilesCalculator" may be of the form: "MilesCalculator:://[airport_code_2].[airport_code_2].roundtrip=[t/f]. In this example, the template takes in three parameters, a first airport code, a second airport code, and a Boolean flag indicating whether the trip is a round trip. In this way, an application access mechanism to access the flight miles calculator functionality of the "MilesCalculator" native application can be generated using the template, given a first airport code, a second airport code, and a designation of whether the flight is one-way or round-trip. In another example, the access mechanism data can include templates that define operations for accessing a state of a software application. For example, the templates can define a manner by which to generate a script to access a native application, and potentially to input one or more parameter values to the native application. Drawing from the "MilesCalculator" example, the template may include operations that cause the operating system to launch the MilesCalculator, and operations that cause the operating system to input a first airport code, a second airport code, and a Boolean flag indicating whether the flight is a round-trip to the MilesCalculator application. The latter operations may include parameter fields that receive the values that are either provided into the search query 102 and/or input into a displayed search result 132' by a user. In this way, a script to access a particular functionality of an application given a set of parameter values may be generated either by the search engine 200 or a user device 300. In particular, the user device 300 can transmit the inputted parameters back to the search engine 200 and the search engine 200 can generate the script or the search engine 200 can provide the access mechanism data 256 in the search results 130, whereby the user device 300 utilizes the instructions and/or template to generate the script.

In some implementations, the access mechanism data 256 can be used to generate one or access mechanisms based on a function ID 242. In these implementations, the access mechanism data 256 can include mappings between parameters in function IDs 242 to parameters in one or more access mechanisms. For instance, in the case of the function ID exampleapp[find_movie_description("The Big Lebowski") (or in an alternate representation
func::exampleapp:find_movie_description/
  movie_title=the_big_lebowski) the access mechanism data can define the mapping of the value indicating a movie title in the function ID 242 (e.g., "The Big Lebowski" to a parameter field in an access mechanism for accessing an edition of exampleapp. For example, the access mechanism data can result in the following access mechanisms:
www.exampleapp.com/movie_title=the_big_lebowski and
exampleapp.com/movie_title=the_big_lebowski.

Layout data 254 includes any suitable data that the user device 300 utilizes to render displayed search result 132'. Layout data 254 can include data that defines the "look and feel" of a displayed search result 132'. The layout data 254 may define the types of elements that appear in a displayed search result 132' and where each element appears in a displayed search result 132'. For instance, the layout data 254 may define where an images (e.g., icons or screen shots of an application) appear in a displayed search result 132', where text may appear in the displayed search result 132', where input elements 134 may appear in the displayed search result 132', where selection elements 136 may appear in a displayed search result 132', where tabs 138 are displayed in a displayed search result 132', and/or where a resize element 139 appears in a displayed search result 132'. Further, the layout data 254 may define other visual features of a displayed search result 132'. For example, the layout data 254 may define the font and font size of text, the text to be displayed in certain elements (e.g., text to be displayed on input elements 134, selection elements 136, and tabs 138. Furthermore, in implementations where a displayed search result 132' can be collapsible, the layout data 254 can define the look and feel of the displayed search result 132' when it is in a collapsed viewing mode and when it is in an expanded viewing mode. Put another way, the layout data 254 can define the layout of the displayed search result 132' when in the collapsed viewing mode and the layout of the displayed search results 132' when in the expanded viewing mode.

The layout data 254 defines the input elements 134 that can be included in a displayed search result 132' as well as tabs 138 and resize elements 139. Examples of input elements 134 include pop-out windows, text input elements, menus, calendars, check boxes, radio buttons, slider bars. A pop-out window is a GUI element that is presented in the foreground of the SERP, leaving the previous interface in the background such that the pop-out window is overlaying the background. A pop-out window can display text and/or images, and may also include other input elements or other GUI elements. A text input element is an input element that allows a user to manually enter text. A menu is an input element 134 that allows a user to select from a predefined list of choices. In some examples, a menu may be presented as a menu bar. Additionally or alternatively, a menu may include sub-menus such that when an item in the menu is selected, a sub-menu is presented to the user. Calendars are input elements 134 that allow a user to enter one or more dates. In some implementations, calendars include pop-out windows that display a calendar where the user can select specific dates. Additionally or alternatively, a calendar may be implemented as one or more drop-down menus. Check boxes, radio buttons, and slider bars, are input elements that allow a user to toggle between two different input values (e.g., two different Boolean values). For example, check boxes, radio buttons, and/or slider buttons may prompt a user to select between one of two options (e.g., round-trip or one-way, male or female, yes or no, true or false, etc.).

The layout data 254 may further define other elements that can be displayed in a displayed search result 132', such as link data, grid data, and tab data. Link data can refer to data and instructions that cause the displayed search result 132' (or a portion thereof) to behave as a user selectable link. The link data can define text or images that are rendered in the displayed search result 132'. The link data may further reference the access mechanism data 256 such that when a user selectable link is selected, the user device 300 displaying the search result 132' accesses the resource based on the access mechanism data 256. In some scenarios, the link data may define a selection element 136. Grid data can define the dimensions of a grid that is displayed in a displayed search result 132'. In this way, a displayed search result 132' may present information in a tabular format (e.g., a spreadsheet), whereby a user may be allowed to edit one or more of the values presented in the grid. Tab data can define data that allows a user to navigate between two or more different tabs of a displayed search result 132'. Tab data can include names of the tabs, as well as can define the particular elements contained in each tab.

The layout data 254 may include input bindings that assign parameter types (e.g., variable names) to the input elements, such that when a user inputs a value into the input element 134, the user device 300 can assign the entered value to a particular parameter value. For example, if a displayed search result 132' includes a text input element that receives values corresponding to a departure airport and the user enters a three letter airport code, the binding assigns the three letter airport code to a parameter that represents the departure airport. In this way, the user device 300 can use the inputted values to request or generate access mechanisms.

The layout data 254 may further include output bindings. An output binding maps values (e.g., an application name, application description, a state name, an application icon, etc.) to various elements of the displayed search result 132'. For example, an element within a displayed search result 132' may display a name of a state, and the display data 252 may define a name of a particular state or application. In this example, the binding may bind the defined name of the state to the element that displays the names of a state, such that when rendered, the displayed search result 132' outputs the name of the state or application.

In some implementations, the layout data 254 may be encoded in a layout file. A layout file can contain a layout object and one or more bindings. The layout file defines the layout of a displayed search result. For example, the layout file can define where each element is located within a displayed search result, the fonts used in each element, the size of each element, and/or the data types of each element. The one or more bindings can include an input binding and an output binding. In this way, content may be presented in a displayed search result 132' and information may be received via the displayed search result 132' in accordance with the layout file. In some implementations, a layout file is provided by an application developer. In these implementations, the application developer can develop custom-made search results. For example, an application developer can decide how displayed search results 132' linking to states of its application appear to a user.

In some implementations, a layout file may be referenced by a layout identifier (layout ID). A layout ID can be a string made up of characters, numbers, and/or symbols that uniquely identify a layout file. In these implementations, a layout file may be stored at the search engine 200, a third party resource, or at the individual user devices 300 and referenced using the layout ID. In implementations where layout files are stored at the individual user devices 300, a result object 132 can include a layout ID and the user device 300 can retrieve the layout file corresponding to the layout ID and render the displayed search result 132' based on content defined in the result object 132 and the retrieved layout file.

In some implementations, each broad action of a software application may have a corresponding layout file. In this way, search results corresponding to different functions of a software application have different looks and feels. For instance, a software application that allows users to watch movie trailers or buy movie tickets may have a first layout file that leverages the watch movie trailer functionality of the software application and a second layout file that leverages the buy movie tickets functionality. In these implementations, the result object record 250 can contain layout IDs for each respective function performed by the software application, such that each layout ID is stored in relation to its respective function and identifies a layout file that corresponds to the respective function.

Reference data 258 includes data that references third party resources (e.g., web servers and/or application servers). According to some implementations, at least a portion of the information used to render a displayed search result 132' may be obtained from a third party resource. The reference data 258 may identify the third party resource from which the information may be obtained. In this way, application functions which depend on real-time data may be supported by the search engine 200. For example, an application may allow users to make reservations for restaurants. In this example, the reference data 258 may indicate an address of a server associated with the application where available reservation times may be obtained. In this way, the search engine 200 or the user device 300 can request and obtain the available reservation times at query-time or rendering-time, thereby insuring that the content that is presented in the displayed is valid and/or fresh data. The reference data 258 may include resource identifiers (e.g., web resource identifier) where the content may be obtained. In some implementations, the reference data 258 may additionally or alternatively define a location where a layout file may be obtained.

Figure 2A:
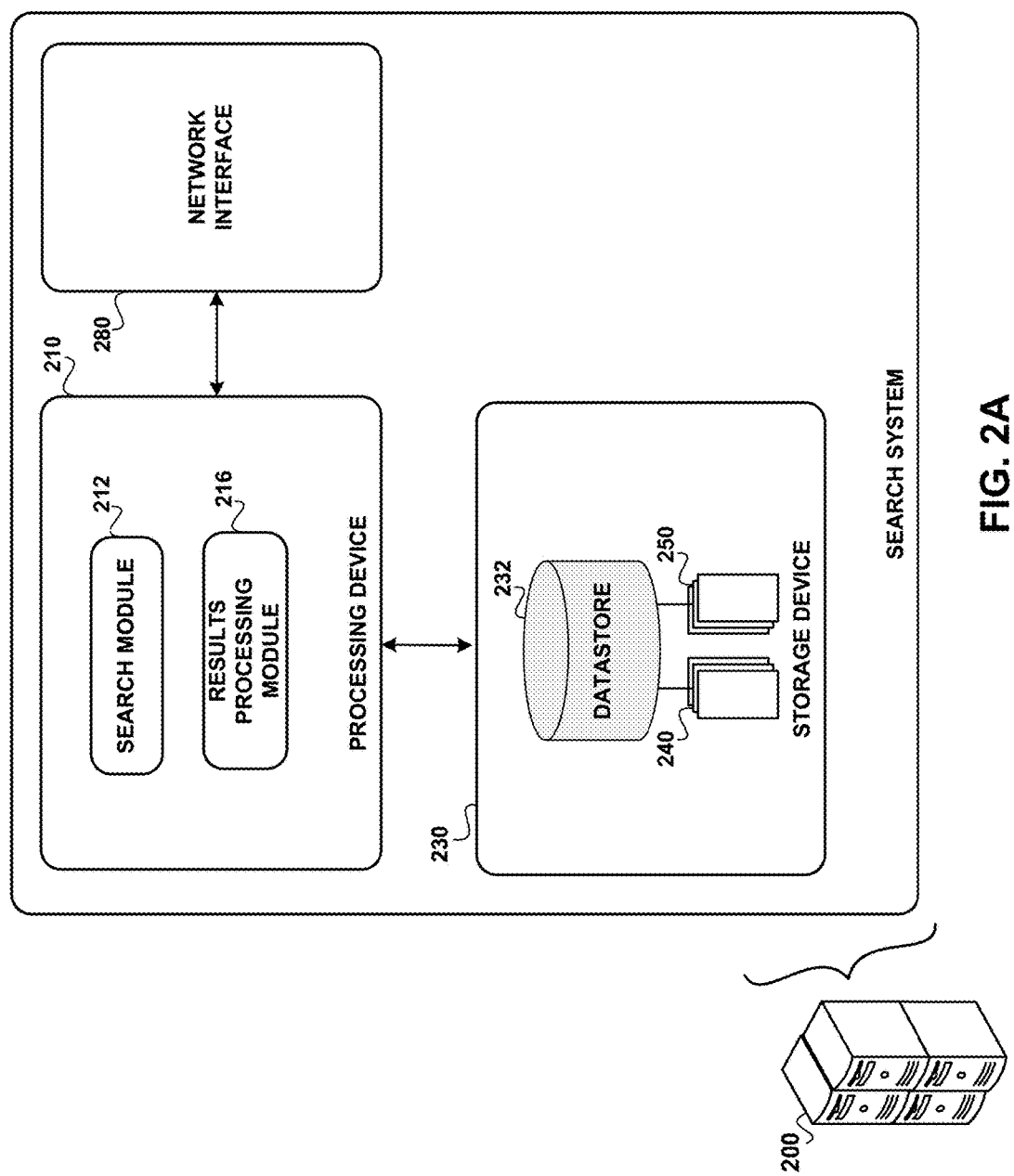
FIG. 2A is a schematic illustrating example components of a search engine.
Figures 2E, 2F:
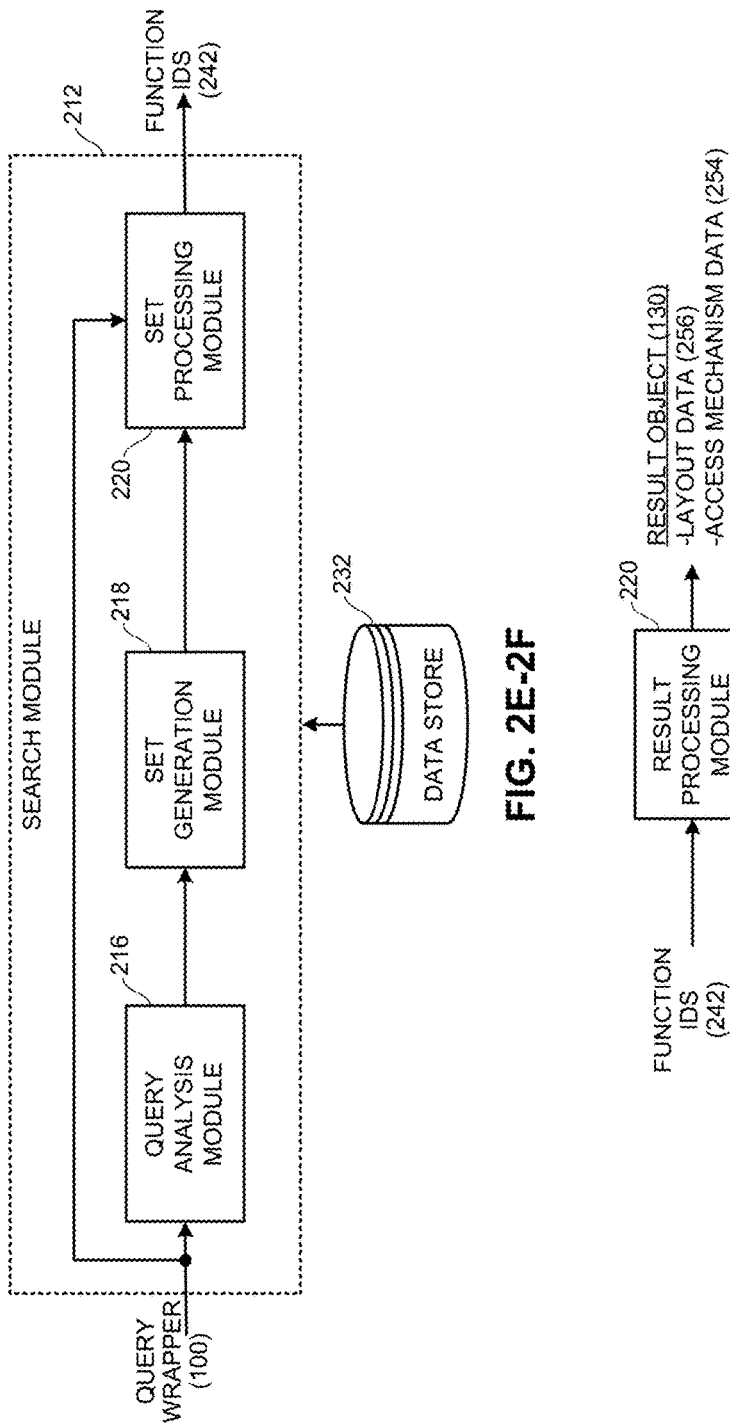
FIG. 2E is a schematic illustrating example components of a search module of the search engine and a data flow thereof.
FIG. 2F is a schematic illustrating example data flow of the results processing module.
Figures 2E, 2F:
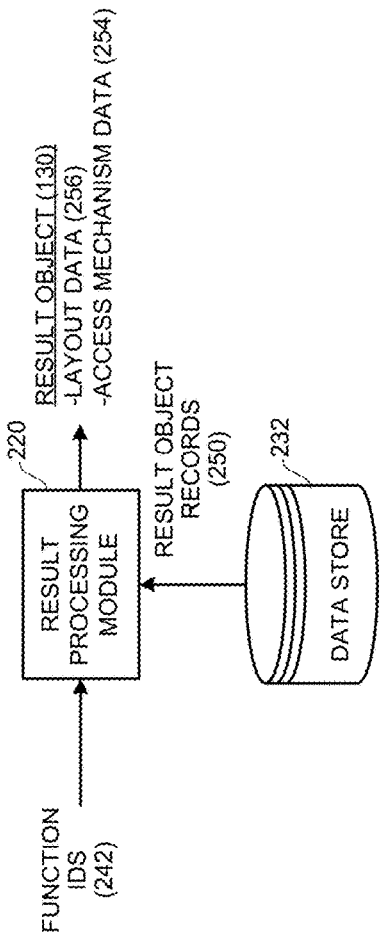

FIG. 2E illustrates a search module 212 according to some implementations of the present disclosure. The search module 212 can include a query analysis module 216, a set generation module 218, and a scoring module 220. The query analysis module 216 receives search queries 102 and outputs tokens based thereon. The set generation module 218 receives the tokens and identifies a consideration set of function IDs 242 (also referred to as a "consideration set") based on the tokens. The consideration set may be represented by one or more function IDs 242. The scoring module 220 receives the consideration set and scores each function ID 242 identified in the consideration set. The scoring module 220 can attribute the score (referred to as a "result score") to its respective function ID 242. The scored function IDs 242 are output to the results processing module 214. The operation of the search module 212 is described in greater detail below.

The query analysis module 216 receives a search query 102, and in some implementations, context parameters (e.g., geolocation of a user device 300 or an operating system type of the user device 300). When the query analysis module 216 receives a search query 102, the query analysis module 216 analyzes the query terms of the search query 102 and/or the context parameters. For example, the query analysis module 216 may perform various analysis operations on the query terms of the received search query 102. Example analysis operations may include, but are not limited to, tokenization of the search query 102, filtering of the search query 102, stemming the query terms of the search query, synonymization of the search terms, and stop word removal. In some implementations, the query analysis module 216 outputs tokens representing the search query 102.

The set generation module 218 identifies a consideration set of function IDs based on the tokens provided by the query analysis module 216. As used herein, the term consideration set of function IDs can refer to a list of function IDs 242. In some scenarios, the function IDs 242 respectively indicate function records 240 that match (at least to some degree) to the search query. In some examples, the set generation module 218 may identify function records 240 based on matches between the tokens and terms contained in the function records 240. For example, the set generation module 218 may identify the function records 240 based on matches between tokens generated by the query analysis module 216 and terms included in the application state information 244 (which may also be tokenized). The set generation module 218 may further determine an initial score for each identified record (and not the result score of the record). In some implementations, the set generation module 218 may utilize the Apache Lucene libraries supported by the Apache Software Foundation to identify the consideration set and obtain the initial scores thereof. The function records 240 may be indexed in one or more search indexes. The search indexes may be inverted indexes that associate keywords and combinations of keywords to the function records 240 in which the keywords and combinations of keywords appear.

The scoring module 220 scores the function IDs 242 indicated by the consideration set. The scores associated with the function IDs 242 may be referred to as "result scores." The scoring module 220 may determine a result score for each of the function IDs 242 identified the consideration set. The result scores associated with a function ID 242 may indicate the relative rank of relevance of a corresponding function record 240 with respect to the other function records 240. For example, a larger result score may indicate that a function record 240 is more relevant to the search query 102. The information conveyed by the search results 130 may depend on how the result scores are calculated by the scoring module 220. For example, the result scores may indicate the relevance of an application state to the search query 102, the popularity of an application state, and/or other properties of the application state, depending on what attributes the scoring module 220 uses to score the function IDs 242.

The scoring module 220 may determine result scores for function IDs 242 in any suitable manner. In some implementations, the scoring module 220 determines a result score of a function ID 242 based on one or more scoring features. The scoring features may be associated with the function record 240 of the function ID 242 and/or the search query 102.

A function record scoring feature (hereinafter "record scoring feature") may be based on any data associated with a function record 240. For example, record scoring features may be based on any data included in the application state information of the function record 240. Example record scoring features may be based on metrics associated with a person, place, or thing described in the function record 240. Example metrics may include the popularity of a place described in the function record and/or ratings (e.g., user ratings) of the place described in the function record 240. In one example, if the function record 240 describes a song, a metric may be based on the popularity of the song described in the function record 240 and/or ratings (e.g., user ratings) of the song described in the function record 240. The record scoring features may also be based on measurements associated with the function record 240, such as how often the function record 240 is retrieved during a search and how often access mechanisms linking to the state represented by the function record 240 are selected by a user when appearing in the search results 130. Record scoring features may also be based on whether the function record 240 describes a default state or a deeper application state.

A query scoring feature may include any data associated with the search query 102. For example, query scoring features may include, but are not limited to, a number of words in the search query 102, the popularity of the search query 102 (e.g., how often the search query 102 is received by the search engine 200 or the total number of times the search query 102 has been received by the search engine 200), and the expected frequency of the words in the search query 102. A record-query scoring feature may include any data generated based on data associated with both the function record 240 and the search query 102 that resulted in identification of the function record 240 by the set generation module 218. For example, record-query scoring features may include, but are not limited to, parameters that indicate how well the terms of the search query 102 match the terms of the application state information of the identified function record 240 (e.g., the initial score assigned to the function record by the set generation module 218).

The scoring module 220 may generate a result score of a function ID 242 based on at least one of the record scoring features, the query scoring features, and the record-query scoring features. The scoring module 220 may determine a result score based on one or more of the scoring features listed herein and/or additional scoring features not explicitly listed. In some examples, the scoring module 220 may include one or more machine learned models (e.g., a supervised learning model) configured to receive one or more scoring features. The one or more machine learned models may generate result scores based on at least one of the record scoring features, the query scoring features, and the record-query scoring features. For example, the scoring module 220 may pair the search query 102 with each function ID 242 and calculate a vector of features for each (query, record) pair. The vector of features may include one or more record scoring features, one or more query scoring features, and one or more record-query scoring features. The scoring module 220 may then input the vector of features into a machine-learned regression model to calculate a result score of the function ID 242. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The scoring module 220 associates each calculated result score with the function ID 242 of the function record 240 to which the calculated score corresponds. The scoring module 220 can provide the scored function IDs 242 to the results processing module 214.

FIG. 2F illustrates an example data flow of the results processing module 214. The results processing module 214 receives scored function IDs 242 and generates result objects 132 based thereon. The results processing module 214 can determine which function IDs 242 on which to base result objects 132 according to the respective scores thereof. In some implementations, the results processing module 214 can rank the function IDs 242 based on their respective scores. The ranked list of function IDs 242 can define the order in which the displayed search results 132' appear in the SERP. Additionally or alternatively, the results processing module 214 can discard any function IDs 242 whose result score does not exceed a threshold.

Furthermore, the results processing module 214 can determine the size and appearance of each displayed search result 132' based on the respective scores. For instance, a displayed search result 132' based on a function ID 242 that has a higher score can be sized bigger than an displayed search result 132' that is based on a function ID 242 having a lower score. Additionally or alternatively, the results score module 220 can determine whether the user device 300 is to initially display a displayed search result 132' is a collapsed viewing mode or an expanded viewing mode. For instance, the results processing module 214 can instruct the user device 300 to display a displayed search result 132' in an expanded viewing mode when the result score of the corresponding function ID 242 exceeds a threshold or is in the highest nth percentile of result scores (e.g., in the top five percentile).

In operation, the results processing module 214 receives a scored function ID 242 and can generate a result object 132 based thereon. Assuming a function ID 242 has a requisite result score associated therewith (e.g., the result score of the function ID 242 is above a threshold or is in the nth percentile of function IDs 242), the results processing module 214 retrieves a result object record 250 from the data store 232 using the function ID 242. As was previously discussed, the function ID 242 identifies a software application. In some implementations, the results processing module 214 retrieves a result object records 250 corresponding to the software application identified by the scored function ID 242. The retrieved result object record 250 includes data and instructions to generate a result object 132 corresponding to the scored function ID 242. The results processing module 214 can instantiate a new result object 132 based on the result object record 250 or a generic data structure that defines the overall structure of the result objects 132 served by the search engine 200. The instantiated result object 132 is populated with information that the user device 300 uses to render the displayed search result 132'.

The results processing module 214 generates a result object 132 based on the layout data 254 contained in the result object record 250. In some implementations, the results processing module 214 determines the broad action indicated by the function ID 242 and identifies the suitable layout file to use based on the broad action. In some of these implementations, a layout ID may point to the suitable layout file, whereby the layout ID is stored in the result object record 250 of the software application and in relation to the broad action defined by the scored function ID 242. The results processing module 214 can include the layout ID in the result object 132, such that the user device 300 can retrieve a layout file that corresponds to the layout ID from its storage device or from a third-party resource. Alternatively, the results processing module 214 may include the layout file in the result object.

The retrieved result object record 250 can further include display data 252. To the extent the displayed search result 132' displays information (e.g., an icon of a software application and a title of the software application), the results processing module 214 can include display data 252 from the result object record 250 in the result object 132. Additionally or alternatively, the results processing module 214 may include reference data 258 in the result object 132. The reference data 258 may indicate a third party resource where information used to populate the displayed search result 132' may be requested. Additionally or alternatively, the results processing module 214 may retrieve the function record 240 corresponding to the function ID 242 and populate the fields defined in the instantiated result object 132 using the application state information 244 defined in the function record 240. In some implementations, the results processing module 214 utilizes an output binding defined in the layout file to bind values in the display data 252 and/or the application state data 244 of the function record 240 to the instantiated result object 132.

The results processing module 214 inserts access mechanism data 244 in each instantiated result object 132. The user device 300 utilizes the access mechanism data 256 to access a state of a software application indicated by the displayed search result 132'. In some implementations, the result object record 250 corresponding to a function ID 242 includes one or more access mechanisms (e.g., a web resource identifier, an application resource identifier, and/or a script) that can be used to access a state of a software application. In these implementations, the result processing module 214 retrieves the access mechanisms from the result object record 250 and populates one or more fields of the instantiated result object 132 with the one or more access mechanisms. In some implementations, the results processing module 214 references a lookup table that associates function IDs 242 with corresponding access mechanisms. In these implementations, the results processing module 214 identifies one or more access mechanisms from the lookup table based on their respective association with a function ID 242. The results processing module 214 populates one or more fields of the instantiated result object 132 with the identified access mechanisms. In some implementations, the access mechanism data 256 can define one or more specifications or templates for generating access mechanisms. In these implementations, the results processing module 214 includes one or more of the specifications or templates defined in a function record 240 in the result object 132, such that the user device 300 can generate an access mechanism to access a state of a software application based on the specification or template and the input entered into a displayed search result 132' by a user.

In some scenarios, the layout data 254 defines multiple layouts corresponding to different viewing modes (e.g., expanded or collapsed). In some implementations, the results processing module 214 determines whether the user device 300 is to initially display a displayed search result 132' in a collapsed viewing mode or an expanded viewing mode based on the result score of a function ID 242 and/or the relative ranking of a function ID 242 to other function IDs. If a function ID 242 has a requisite result score, the results processing module 214 can set a flag in the corresponding result object 132 that instructs the user device 300 to initially display the displayed search result 132 in an expanded viewing mode. In some implementations, the default viewing mode is the collapsed viewing mode, whereby all collapsible displayed search results 132' are initially displayed in a collapsed viewing mode.

The results processing module 214 can process the scored function IDs 242 in any suitable manner. In some implementations, the results processing module 214 is configured to generate the result objects 130 from the scored function IDs 242 in parallel, such that multiple function IDs 242 are processed concurrently. In other implementations, the results processing module 214 is configured to generate the result objects 130 from the scored function IDs 242 in a serial manner, such that the function IDs 242 are processed sequentially. The results processing module 214 can encode the result objects 130 into a container, such as a hyper-text markup language (HTML) document that can be embedded in another HTML document (e.g., via an iFrame) or a Java script objection notation (JSON) object. In this way, the container contains the search results 130. The results processing module 214 (or any other suitable module) can transmit the search results 130 to the user device 300 which transmitted the search query 102. The user device 300 receives and renders the search results 130 into displayed search results 132'.

Figure 3:
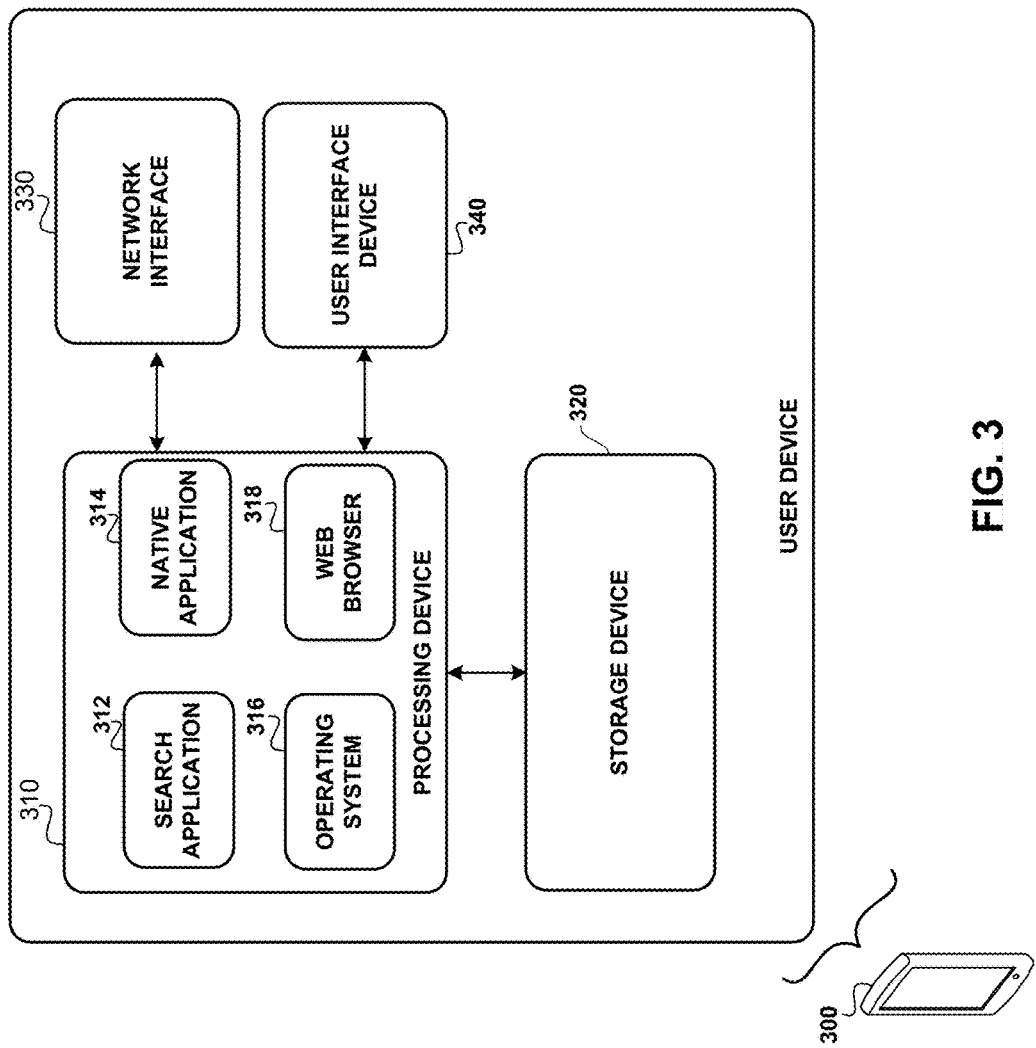
FIG. 3 is a schematic illustrating example components of a user device.

FIG. 3 illustrates a user device 300 configured to facilitate searches. In particular, the user device 300 is configured to provide search queries 102 to the search engine 200 and to render search results 130 received from the search engine 200. In the illustrated example, the user device 300 includes a processing device 310, a storage device 320, a network interface 330, and a user interface 340.

The processing device 310 includes memory (e.g., RAM and/or ROM) that stores computer readable instructions and one or more processors that execute the computer readable instructions. In implementations where the processing device 310 includes two or more processors, the processors can execute in a distributed or individual manner. The processing device 310 may execute a search application 312, a web browser 318, an operating system 316, and one or more native applications 314, all of which may be embodied as computer readable instructions. The storage device 320 includes one or more computer readable mediums (e.g., hard disk drive and/or flash memory). The storage device 320 can store the computer readable instructions that make up the search application 312, the web browser 318, operating system 316, and the one or more native applications 314. The network interface 330 includes one or more devices that are configured to communicate with the network. The network interface 330 can include one or more transceivers for performing wired or wireless communication. Examples of the network interface 330 can include, but are not limited to, a transceiver configured to perform communications using the IEEE 802.11 wireless standard, an Ethernet port, a wireless transmitter, and a universal serial bus (USB) port. The user interface 340 includes one or more devices that receive input from and/or provide output to a user. The user interface 340 can include, but is not limited to, a touchscreen, a display, a QWERTY keyboard, a numeric keypad, a touchpad, a microphone, and/or speakers.

The search application 312 displays a search bar and receives search queries 102 via the search bar (see e.g., FIG. 1C). In particular, a user can enter one or more query terms into the search bar. In some implementations, the search application 312 waits until the user executes the search (e.g., presses upon a "search" button displayed in relation to the search bar) to transmit a search query 102 to the search engine 200. In response to the search query 102, the search engine 200 responds with search results 130. The search application renders and displays the search results 130 in the SERP.

In other implementations, the search application 312 transmits the contents of the search query 102 as the user enters the query terms. In these implementations, the search application 312 can transit a new search query 102 each time the user enters a character into the search bar and the search engine 200 can update the search results 130 as the user continues to enter the search query 102. In response to the updated search results 130, the search application 312 renders and displays the search results 130 in the SERP.

The search application 312 can receive a user selection of a displayed search result 132'. In response to the selection of a displayed search result 132', the search application 312 can access a state of the software application indicated by the displayed search result 132'. In some scenarios, a displayed search result 132' includes one or more input elements 134. In the instance that a user respectively enters one or more values into the one or more input elements 134, the search application 312 obtains an access mechanism for accessing the application and accesses the application indicated by the displayed search result 132' using the access mechanism. In some implementations, the result object 132 from which the displayed search result 132' was rendered includes one or more specifications or templates for generating an access mechanism given a set of parameter types. For example, if a displayed search result 132' allows a user to enter values for making hotel reservations (e.g., FIG. 1C), the user may enter a location (e.g., a city name), a check-in date, a checkout date, a number of rooms, and a number of guests. The search application utilizes the inputted values to obtain an access mechanism. In some implementations, the search application 312 obtains one or more access mechanisms that are based on the inputted values using access mechanism data 256 transmitted in the result object 132 on which the selected displayed search result 132' was based. For example, the search application 312 may utilize a template to generate an application resource identifier given a set of parameters (e.g., a location, a check-in date, a checkout date, a number of guests, and a number of rooms). The search application 312 can utilize an input binding or similar mechanism to identify the parameter type of each value. For each identified parameter type, the search application 312 can populate a corresponding field in the template with the inputted value that was mapped to the parameter type. In this way, the search application 312 generates an application access mechanism that accesses a state of the native application edition of the application using the inputted parameters. The access mechanism data can include templates or specifications for generating scripts and/or web resource mechanisms. The search application 312 can generate scripts and/or web resource identifiers in the manner described above. In other implementations, the search application 312 provides a request to the search engine 200 to generate one or more access mechanisms given the inputted values. The requests can include fields defining different parameter types, and each fields may have an inputted value assigned thereto. In response to the request, the search engine 200 generates one or access mechanisms based on the inputted values and transmits the one or more access mechanisms to the user device 300. In some implementations, the search engine 200 generates the one or more access mechanisms in the manner described above.

In some implementations, a displayed search result 132' that receives values in one or more input elements may include an unparameterized function ID 242 (e.g., exampleapp[broad_action(param_1, param_2)]). The parameter types defined in the unparameterized function ID 242 may correspond to the parameter types received by the displayed search result 132' (e.g., the displayed search result receives param_1 and param_2). In response to the user entering values into the input elements of the displayed search result 132', the search application 312 parameterizes the function ID 242. The search application 312 can obtain one or more access mechanisms based on the function ID 242. In some implementations, the search application 312 can provide the parameterized function ID 242 to the search engine 200, which in turn determines the one or more access mechanisms. Alternatively, the result object 132 that contained the unparameterized function ID 242 may further include access mechanism data 256. In these implementations, the access mechanism data 256 defines a specification by which the search application 312 can generate one or more access mechanisms from a parameterized function ID 242. In these implementations, the search application 312 can parameterize the function ID 242 based on the user input and can then generate the one or more access mechanisms based on the parameterized function ID 242 and the access mechanism data 256.

When a user selects a displayed search result 132', the search application 312 accesses a state of a software application using an access mechanism. Accessing a state of a software application can include determining whether a native application edition of the software application referenced by the access mechanism is installed on the user device 300. If so, the search application 312 instructs the operating system of the user device 300 to launch the native application and to set the state of the native application in accordance with the access mechanism. In some implementations, if a native application edition of the software application is not installed, the search application can instruct the operating system to launch the web browser application 318 and access the state of the web application edition of the application using a web resource identifier. Additionally or alternatively, the search application 312 can prompt a user to download a native application edition of the software application. In this scenario, the search application 312 can instruct the operating system to launch a digital distribution application, whereby the user can elect to download the native application edition. In such implementations, the search application 312 can access the state of the software application once the native application edition is downloaded.

If a displayed search result 132' includes a resize element 139 and the user selects the resize element 139, the search application 312 adjusts the viewing mode of the displayed search result 132'. In some implementations, the result objects 132' from which displayed search results 132' are generated can define multiple layouts of the displayed search result 132', such that the result objects 132' support multiple viewing modes (e.g., collapsed and expanded). In these implementations, the search application 312 can initially display the search result 132' in a default viewing mode (e.g., in a collapsed viewing mode). Additionally or alternatively, the search application 312 can initially display the search result 132' in accordance with an instruction in the result object 132. For example, if the result object 132 has a flag set that indicates that the search result 132' is to be initially displayed in an expanded viewing mode, the search application 312 displays the search result in the expanded viewing mode, as defined in the layout data contained in the result object 132.

When the user selects (e.g., presses on) the resize element 139 of a displayed search result 132', the search application 312 adjusts the viewing mode of the displayed search result 132'. For instance, if the displayed search result 132' is in a collapsed viewing mode, and the user selects the resize element 139, the search application 312 can render and display the displayed search result 132' in an expanded viewing mode. Similarly, if the displayed search result 132' is in an expanded viewing mode, and the user selects the resize element 139, the search application 312 can render and display the displayed search result 132' in a collapsed viewing mode. In some implementations, the search application 312 parses the result object 132 and identifies the layout data corresponding to the selected viewing mode, and renders the displayed search result 132' based on the identified layout data.

In some implementations, the search application 312 receives result objects 132 that include reference data that identifies a resource from which the search application 312 can obtain real-time data of an application. For example, a restaurant review application requires real-time data that indicates what reservation times are available. Similarly, a sports news application requires real-time data that indicates scores of on-going matches or games. In some of these implementations, the search application 312 initially renders and displays the displayed search result 132' in a collapsed viewing mode. When a user selects the resize element 139 of the displayed search result 132', the search application 312 generates a request to the application resource (e.g., a web server or application server) and transmits the request thereto. The application resource returns the requested data to the search application 312. The search application 312 may then render and displayed search result 132' in the expanded viewing mode using the real-time data received from the application resource. In some implementations, the search application 312 utilizes an output binding to bind the received data to an instantiated layout object, as was described above. In this way, the search application 312 can include real-time data in a displayed search result 132' and at the same time conserve bandwidth consumption, as requests to an application resources are only transmitted to the application resource when the user is interested in the real-time data.

Figure 4:
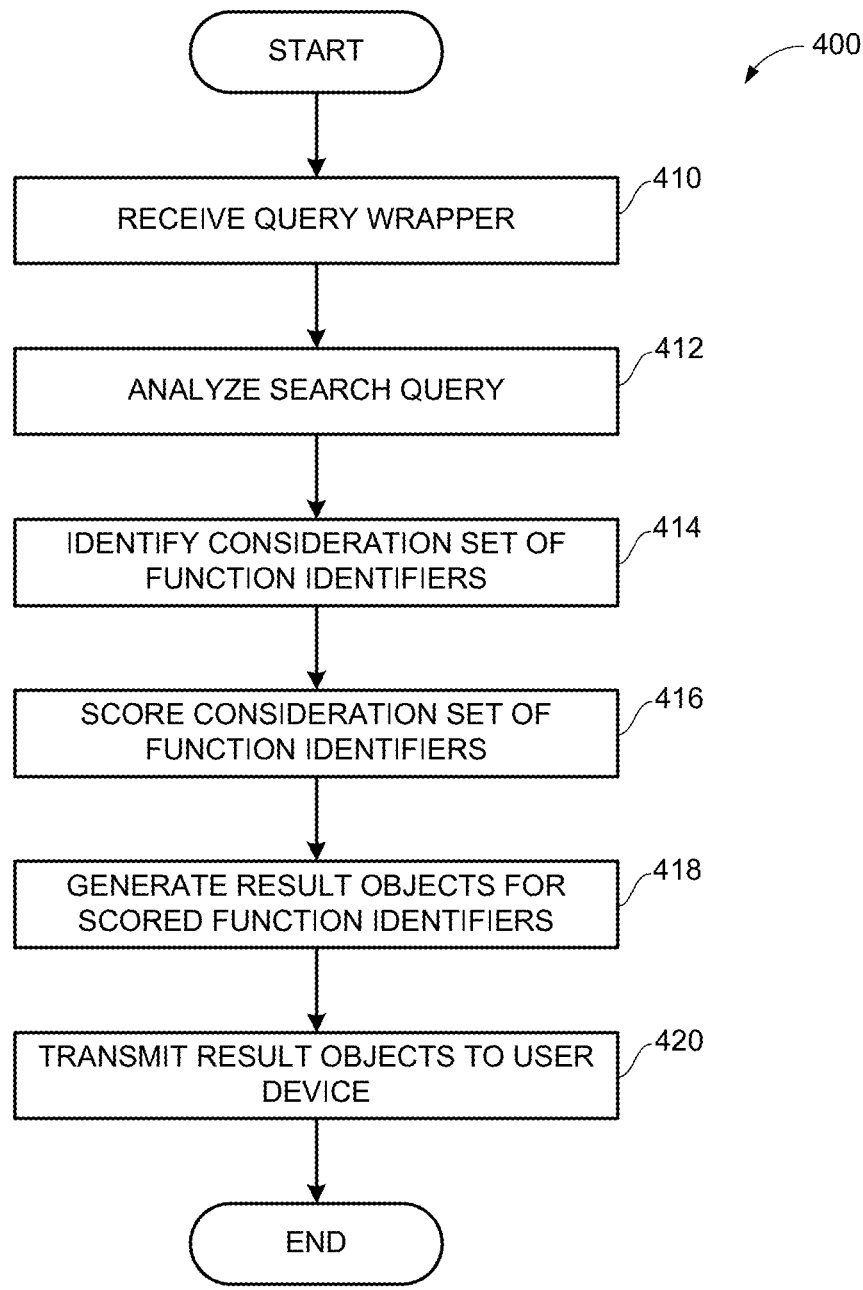
FIG. 4 is a flow chart illustrating an example set of operations of a method for processing a search query.

FIG. 4 illustrates an example set of operations of a method 400 for processing a search query 102. For purposes of explanation, the method 400 is explained with respect to the search engine 200 of FIGS. 2A-2F and is executed by the processing device 210 thereof. The method 400 may, however, be executed on any suitable computing device.

At operation 410, the query analysis module 216 receives a query wrapper 100 from a user device 300. The query wrapper 100 contains a search query 102 and may contain additional context parameters 104. At operation 412, the query analysis module 216 analyzes the search query 102, and in some implementations, the additional context parameters 104. The query analysis module 216 parses and analyzes the search query 102 and outputs one or more tokens. As previously discussed, the search query 102 contains one or more query terms. The query analysis module 216 can stem the search query 102, synonymize the search query 102, remove stop words from the search query 102, and/or tokenize the search query 102. The query analysis module 216 outputs one or more tokens representing the search query 102 (and potentially the context parameters) to the set generation module 218.

At operation 414, the set generation module 218 identifies a consideration set of function IDs 242 based on the one or more tokens. The set generation module 218 can search the data store 232 using the tokens. As previously discussed, in some implementations the set generation module 218 utilizes the Lucene Library to search and identify a consideration set of function IDs 242. The consideration set includes function IDs 242 of function records 240 that at least matched a minimum number of tokens to the search query 102. In some implementations, each function record 240 identified in the consideration set is also provided an initial score based on the degree to which the function record 240 matched to the tokens of the search query 102. The set generation module 218 outputs the consideration set to the scoring module 220.

At operation 416, the scoring module 220 scores each function ID 242 in the consideration set and outputs the scored function IDs 242 to the results processing module 214. The scoring module 220 receives the consideration set from the set generation module 218. For each function ID 242, the scoring module 220 can retrieve the corresponding function record 240 and calculate a score based on the contents of the function record 240. In some implementations, the scoring module 220 includes a machine-learned scoring model that scores a function ID 242 based on a number of scoring features, including features of the function record 240 of the function ID 242, features of the search query 102, and/or features of the function record 240 as it relates to the search query 102. The scoring module 220 outputs the scored function ID 242 to the results processing module 214.

At operation 418, the results processing module 214 generates result objects 130 based on the scored function ID 242. In some implementations, the results processing module 214 ranks the function IDs 242 included in the consideration set based on the respective results scores of the function IDs 242. Additionally or alternatively, the results processing module 214 determines the function IDs 242 on which to base the search results 130 based on the results scores. For instance, the results processing module 214 can keep function IDs 242 having results scores that exceed a minimum threshold or the function IDs 242 having results scores in the nth highest percentile.

The results processing module 214 generates result objects 130 based on the function IDs 242 that are kept. In some implementations, the results processing module 214 retrieves result object records 250 from the data store 232 using the function IDs 242. For each retrieved result object record 250, the results processing module 214 generates a result object 132 using the layout data 254 and the access mechanism data 256. Furthermore, the results processing module 214 can include display data 252 in the result object 132 and/or reference data 258 (which identifies resources where additional data can be requested). In some implementations, the results processing module 214 instantiates a new result object based on the result object record 250 or a generic result object template. The result processing module 214 can include a layout ID (or a layout file), display data, and one or more access mechanisms in the new result object. In some implementations, the results processing module 214 determines whether the displayed search result 132' is to be displayed in a collapsed or expanded viewing mode based on the result score of the function ID 242. In these implementations, the results processing module 214 can set a flag based on the determination. The result processing module 214 can generate result objects for each of the function IDs 242 in this manner. At operation 420, the results processing module 214 transmits the generated result objects 132 to the user device 300 that transmitted the request. The results processing module 214 can encode the result objects in a container, such as a hyper-text markup language (HTML) document that can be embedded in another HTML document (e.g., via an iFrame) or a Java script objection notation (JSON) object. The results processing module 214 (or any other suitable module) transmits the container (i.e., the search results 130) to the user device 300.

Figure 5:
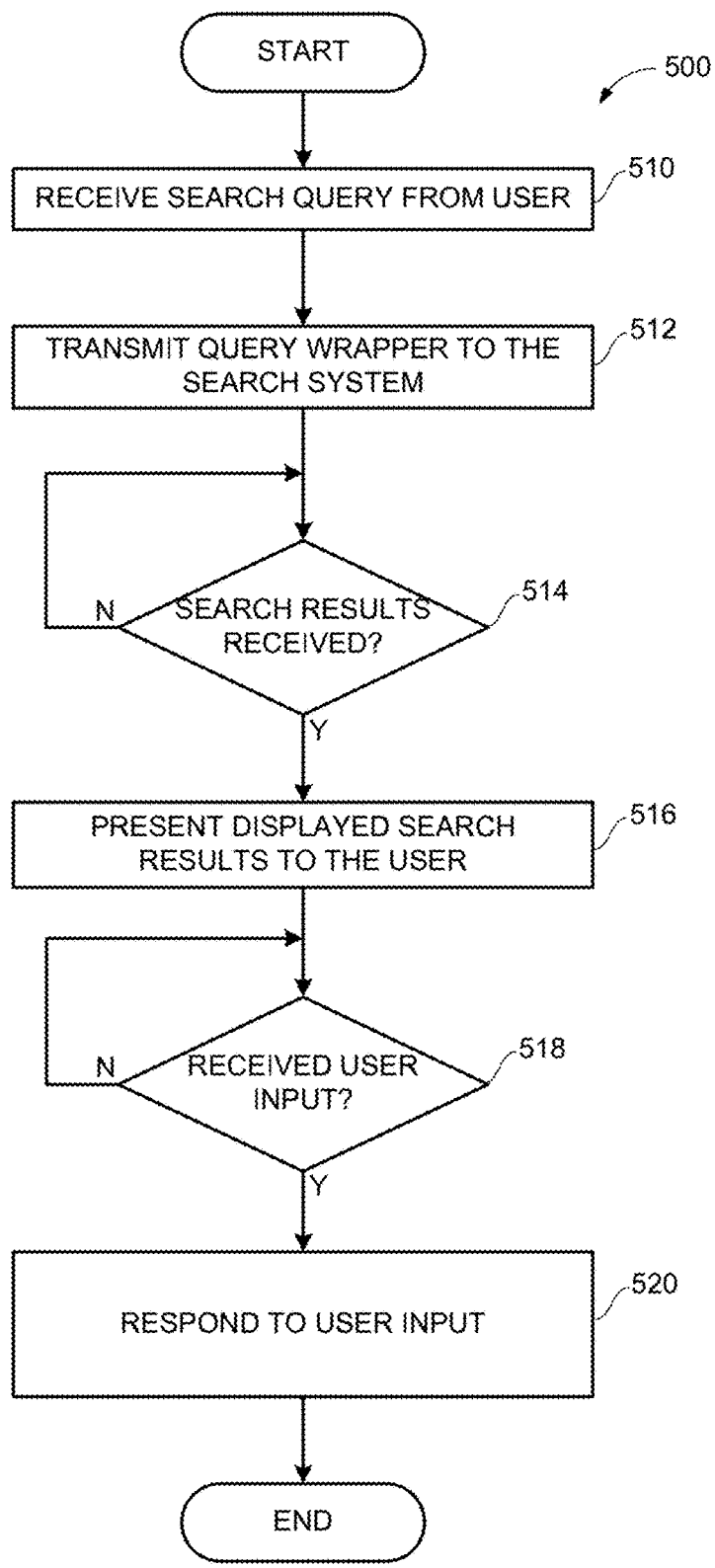
FIG. 5 is a flow chart illustrating an example set of operations of a method for performing a search on a user device.

FIG. 5 illustrates an example set of operations of a method 500 for performing a search on a user device 300. The method 500 is explained with reference to the search application 312 being executed by the processing device 310 of the user device 300. The method 500, however, may be performed by any suitable application executing on the user device 300.

At operation 510, the search application 312 receives a search query 102 from a user. A user can enter the search query 102 into a search bar displayed in a GUI by the search application 312. The search application 312 can determine any additional context parameters to include in the search query 102 (e.g., geolocation, operating system type, username, etc.).

At operation 512, the search application 312 transmits a search query 102 to the search engine 200. The search application 312 can generate a query wrapper 100 that contains the search query 102 and, in some implementations, any context parameters determined by the search application 312. The search application 312 can transmit the search query 102 when the user instructs the search application 312 to transmit the search query 102 (e.g., by pressing a "search" button) or each time the user enters a new character in the search bar.

At operation 514, the search application 312 waits to receive search results 130 from the search engine 200. When the search application 312 receives the search results 130, the search application 312 renders the result objects 132 contained in the search results 130 into respective displayed search results 132' and presents the displayed search results 130' in the SERP, as shown at operation 516. In some scenarios, a displayed search result 132' can be presented in a collapsed viewing mode or a displayed viewing mode. One or more of the displayed search results 132' may include input elements 134.

At operation 516, the search application 312 waits for user input, and when user input is received, at operation 518, the search application 312 responds to the user input, at operation 520. In some scenarios, a user provides user input in relation to a displayed search result 132' that includes input elements 134. In these scenarios, user input can include entering values into one or more input elements 134, selection of a tab 138, selection of a resize element 139, selection of a header 137, and/or selection of a selection element 136.

In the case a user selects a tab 138, the search application 312 alters the information displayed in the displayed search result 132'. For example, a displayed search result 132' may display a first set of input elements 134 to access a first function of a software application, while a tab 138 may indicate a second set of input elements 134 to access a second function of the software application, whereby the second set of input elements 134 are not shown in the displayed search result 132'. In response to selection of the tab 138 (e.g., pressing on the tab 138), the search application 312 alters the appearance of the displayed search result 132' thereby displaying a portion of the displayed search result 132' corresponding to the hidden elements (e.g., the second set of input elements 134).

In the case a user enters values into one or more input elements 134, the search application 312 can display the inputted values in the input elements 134. The user can then select a selection element 136 to execute the displayed search result 132'. In response to selection of the selection element 136, the search application 312 obtains one or more access mechanism(s) corresponding to the inputted values. In some implementations, the search application 312 requests the access mechanism(s) from the search engine 200, whereby the request includes the inputted values. In other implementations, the search application 312 generates the access mechanisms(s) using a specification or template defined in the result object 132 and the inputted values. The search application 312 can obtain the access mechanism(s) in any other suitable manner. The search application 312 can then access the state of the software application using one of the one or more access mechanisms. For instance, the search application 312 can determine whether a native application edition of the software application is installed on the user device 300, and if so, instruct the operating system to launch the native application edition using the access mechanism. The operating system launches the native application edition and sets the state of the software application in accordance with the access mechanism (in this case an application access mechanism). If the native application edition is not installed, the search application 312 can instruct the operating system to launch the web browser application 318 and to access the state of the software application using a web resource identifier.

In some implementations, the selection of a header element 137 causes the search application 312 to access a default state of an application. For instance, the search application 312 can determine whether a native application edition of the application is installed on the user device 300, and if so, the search application 312 instructs the operating system to launch the native application edition to a default state using a default application access mechanism. The operating system launches the native application edition and sets the state of the software application to the default state.

Figure 6:
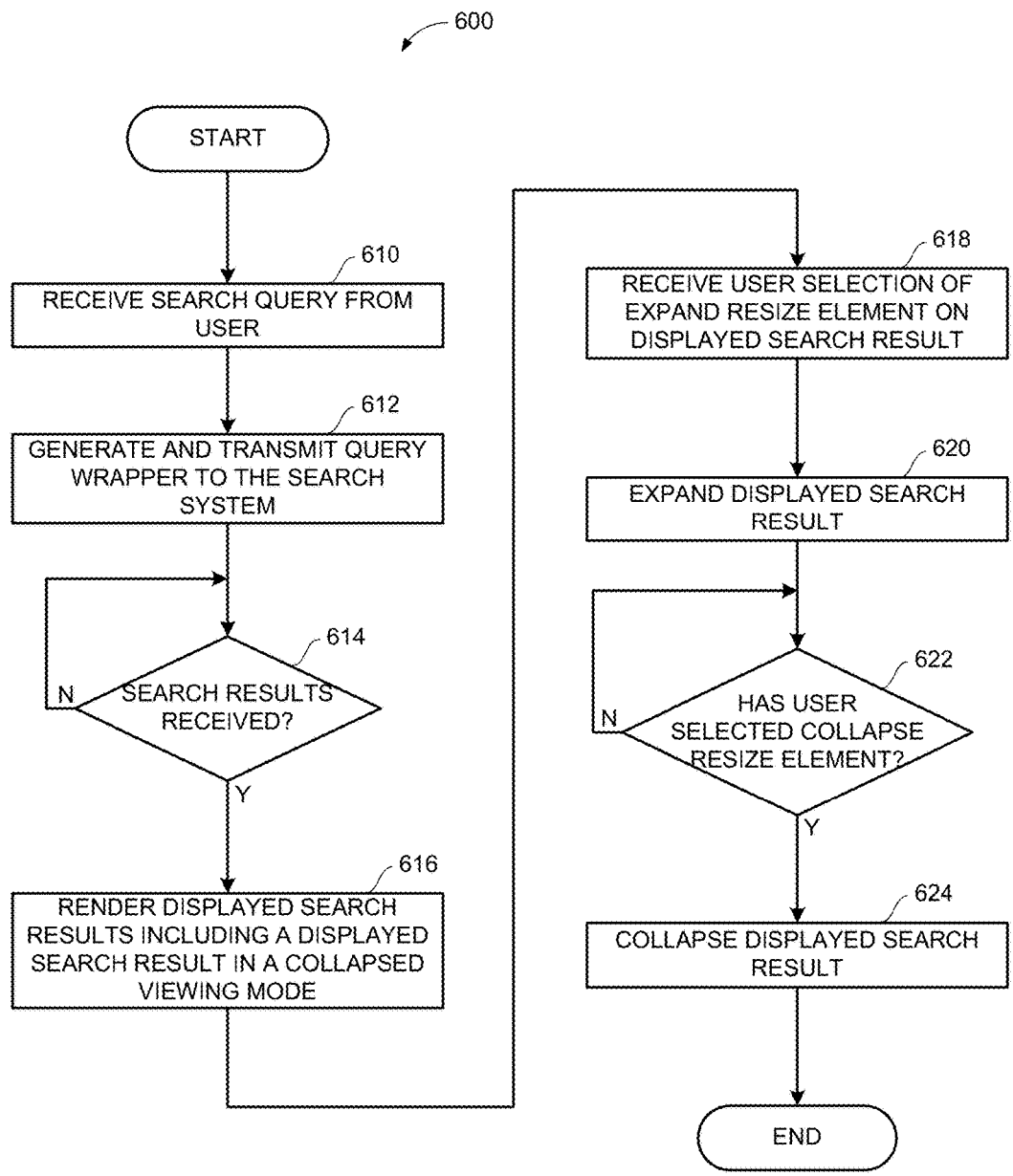
FIG. 6 is a flow chart illustrating an example set of operations of a method for responding to a user selection of a resize element.

FIG. 6 illustrates an example set of operations for a method 600 for responding to a user selection of a resize element 139. The method 600 is explained with respect to the search application 312. The method 600, however, may be executed by any suitable application.

At operation 610, the search application receives a search query 102 from a user, as described above. At operation 612, the search application 312 transmits the search query 102 to the search engine 200. As was described above, in some implementations the search application 312 generates a query wrapper 100 containing the search query 102 and zero or more context parameters. The search application 312 transmits the query wrapper 100 to the search engine 200. At operation 614, the search application 312 waits for search results 130.

At operation 616, the search application 312 renders and presents displayed search results 130' based on the received search results 130. The displayed search results 130' include a modifiable displayed search result 132'. In this example, the search application 312 renders and presents the modifiable displayed search result 132' in a collapsed viewing mode. In some implementations, the search application 312 utilizes a portion of a result object 132 defining the collapsed viewing mode to render the displayed search result 132'. The displayed search result 132' includes a resize element 139.

At operation 618, the search application 312 receives a user selection of a resize element 139. For example, the user may press or click on the resize element 139. At operation 620, the search application 312 expands the displayed search result 132'. For example, the search application 312 can render a portion of the result object 132 corresponding to the expanded viewing mode, and can replace the collapsed viewing mode representation of the displayed search result 132' with the expanded viewing mode representation thereof. The collapsed viewing mode representation of the displayed search result 132' also includes a resize element 139. At operation 622, the search application 312 waits for a user selection of the resize element 139. In response to the user selection of the resize element 139, the search application 312 collapses the displayed search result 132', at operation 624. For example, the search application 312 can render a portion of the result object 132' corresponding to the collapsed viewing mode, and can replace the expanded viewing mode representation of the displayed search result 132' with the collapsed viewing mode representation. In accordance with the method 600 described above, the search application can toggle between the expanded viewing mode representation and the collapsed viewing mode representation.

Figure 7:
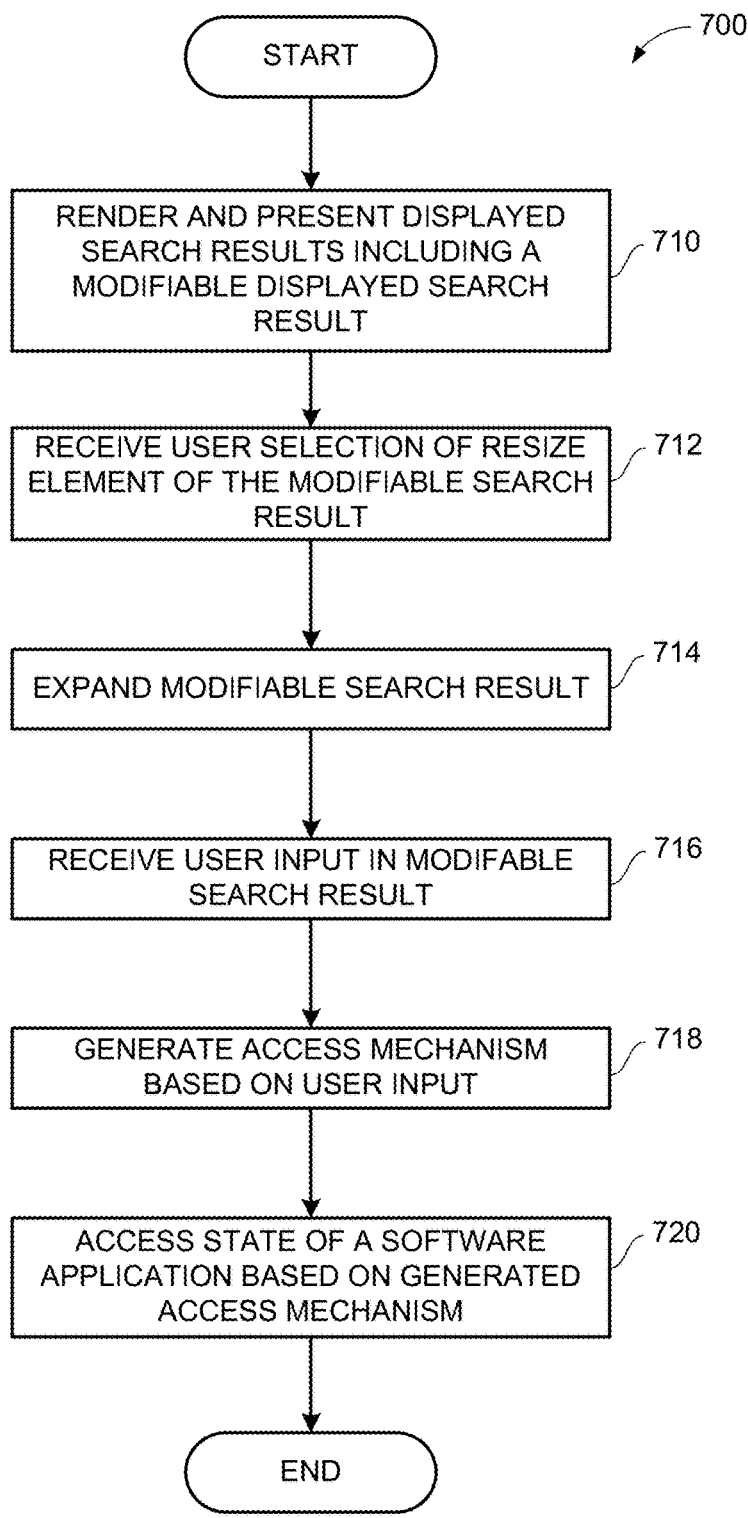
FIG. 7 is a flow chart illustrating an example set of operations of a method for accessing a state of an application.

FIG. 7 illustrates an example set of operations of a method 700 for accessing a state of an application. The method 700 is explained with respect to the search application 312. The method 700, however, may be executed by any suitable application.

At operation 710, search application 312 renders and presents displayed search results 130' in the SERP, including a modifiable search result 132'. The search application 312 receives the search results 130 in response to a search query 102, as was described above. In some implementations, the result object 132 from which a modifiable search result 132' is generated includes a flag indicating whether the modifiable search result 132' is to be rendered in a collapsed or expanded viewing mode. Additionally or alternatively, the modifiable search result 132' is rendered and presented in a default viewing mode (e.g., a collapsed viewing mode). In this example, the modifiable search result 132' is initially presented in a collapsed viewing mode.

At operation 712, the search application 312 receives a user selection of a resize element 139 displayed in relation to the modifiable search result 132'. For instance, the user may press on the resize element 139. At operation 714, the search application 312 expands the modifiable search result 132'. The search application 312 can render and present the modifiable search result 132' in an expanded viewing mode, as was described above. At operation 716, search application 312 receives user input in one or more input elements 134 of the modifiable search result 132'. The user may enter values into the input elements 134 via the user interface 340 of the user device 300. The user can then execute the modifiable search result 132' by, for example, selecting a selection element 136 displayed in relation to the modifiable search result 132'.

At operation 718, the search application 312 generates one or more access mechanisms based on the values entered into the input elements 134. In some implementations, the search application 312 associates the values inputted by the user with parameter types accepted by the application indicated by the modifiable search result 132' using an input binding. As previously discussed, an input binding may be communicated in the result object 132 from which the modifiable search result 132' is rendered. The input binding associates the input elements 132 to respective parameter types accepted by the application indicated by the search result 132'. In this way, the search application 312 can associate the inputted values to the parameter types accepted by the application. The search application 312 then generates one or more access mechanisms based on access mechanism data 256 contained in the result object 132 from which the modifiable search result 132' was generated. For example, the access mechanism data 256 may contain a first template for generating an application resource mechanism and a second template for generating a web resource identifier. In some examples, the templates include a first portion that indicates the web or native application edition of the application and a second portion that defines a scheme for accessing a state of the software application. The scheme may include fields that respectively define parameter types and receive values. The search application 312 can substitute the values inputted into the modifiable search results into the fields of the templates. In some implementation, the search application 312 utilizes the associations between the inputted values and the known parameter types to populate the fields of the templates, thereby generating the access mechanisms. The search application 312 may generate the access mechanisms in any other suitable manner. For instance, the search application 312 may utilize a specification that defines instructions for generating access mechanisms for a particular application given a set of inputted values with known parameter types. In other implementations, the search result 132' includes an unparameterized function ID 242. In these implementations, the search application 312 can parameterize the unparameterized function ID 242 based on the values inputted by the user. The search application 312 can generate the access mechanisms based on the parameterized function ID 242 and the access mechanism data 256.

At operation 720, the search application 312 accesses the application using the generated access mechanism(s). As was previously discussed, the search application 312 may determine whether a native application edition of the application is installed on the user device 300, and if so, the search application 312 the native application edition using an application resource identifier. Otherwise, the search application 312 may access a web application edition of the application using a web resource identifier. Additionally or alternatively, the search application 312 may prompt the user to download a native application edition of the application if it is not already installed on the user device 300. In such a scenario, the search application 312 may access the downloaded native application edition using the application resource identifier upon receiving confirmation that the native application edition has been downloaded to and installed on the user device 300.

Figure 8:
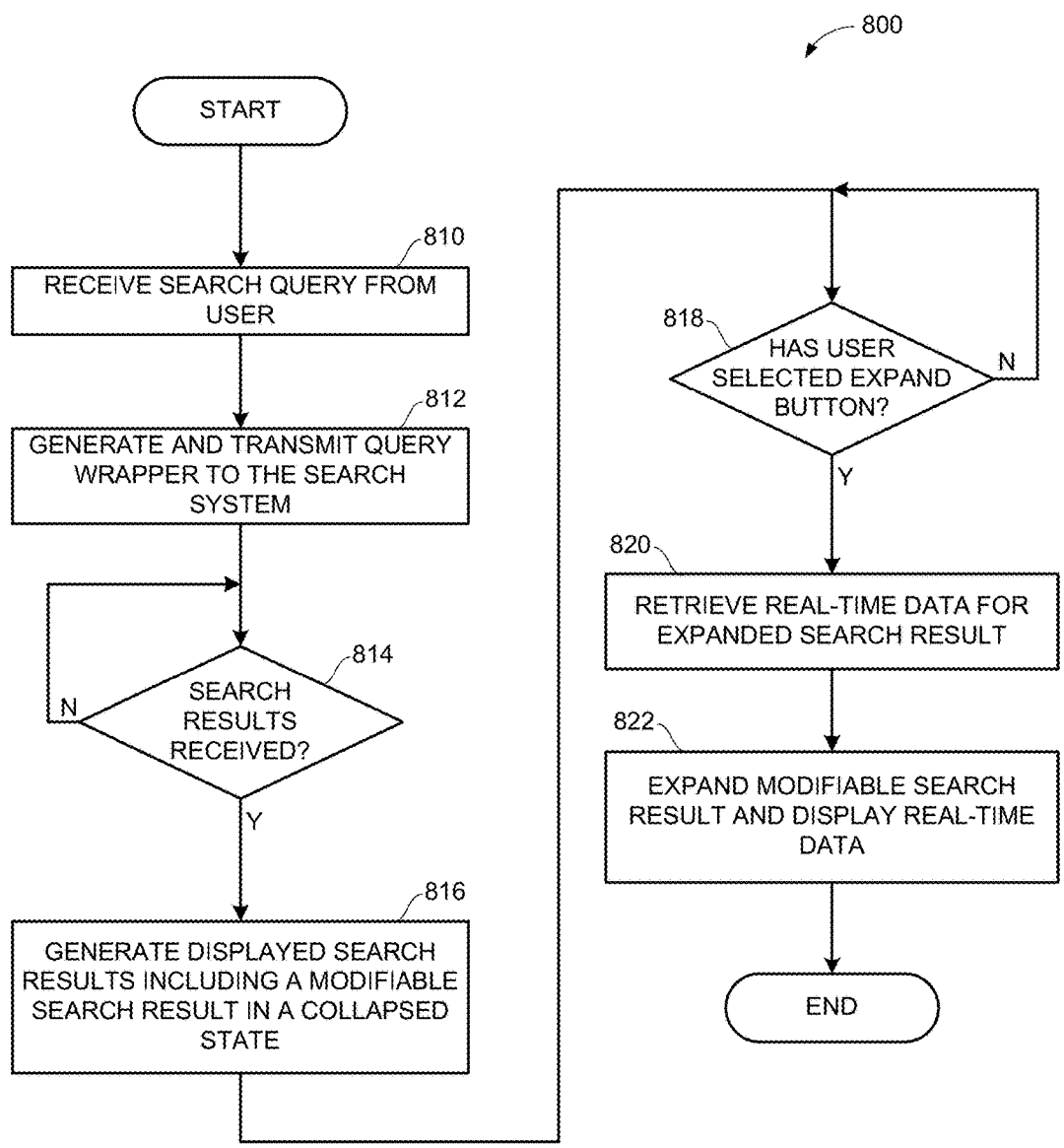
FIG. 8 is a flow chart illustrating an example set of operations of a method for displaying real time data in search results.

FIG. 8 illustrates an example set of operations for a method 800 for presenting real-time data in a modifiable search result 132'. The method 800 is explained with respect to the search application 312. The method 800, however, may be executed by any suitable application.

At operation 810, the search application receives a search query 102 from a user, as described above. At operation 812, the search application 312 transmits the search query 102 to the search engine 200. As was described above, in some implementations the search application 312 generates a query wrapper 100 containing the search query 102 and zero or more context parameters. The search application 312 transmits the query wrapper 100 to the search engine 200. At operation 814, the search application 312 waits for search results 130.

At operation 816, the search application 312 renders and presents displayed search results 130' based on the received search results 130. The displayed search results 130' include a modifiable displayed search result 132'. In this example, the search application 312 renders and presents the modifiable displayed search result 132' in a collapsed viewing mode based on the contents of a corresponding result object 132. In some implementations, the search application 312 utilizes a portion of a result object 132 defining the collapsed viewing mode to render the displayed search result 132'. The displayed search result 132' includes a resize element 139. In this example, the result object 132 includes reference data 258 that indicates a resource (e.g., an application server or web server related to the application) that provides real-time data.

At operation 818, the search application 312 waits for a user selection of a resize element 139. For example, the search application 312 may wait for a user to press or click on the resize element 139. Upon receiving the user selection of the resize element 139, the search application 312 obtains real-time data from the resource indicated in the result object 132 from which the modifiable search result 132' was rendered, as shown at operation 820. In some implementations, the search application 312 transmits a request to the resource using the reference data 258 defined in the result object 132. The resource responds with the real-time data. At operation 822, the search application 312 renders and presents the modifiable search result 132' in the expanded viewing mode. In some implementations, the search application 312 can render the expanded viewing mode representation of the modifiable search result 132 and can bind the real-time data to the modifiable search result 132 in accordance with an output binding. The search application 312 presents the modifiable search result 132 in the SERP in the expanded viewing mode. In this way, the search results 130 can present real-time data in the search results 132, while reducing bandwidth consumption as well as conserving real estate in the SERP until it is needed.

The methods 400, 500, 600, 700, 800 described above are provided for example only and not intended to limit the scope of the disclosure. The ordering of the operations is not mandatory and some operations may be performed in parallel. Further alternate or additional operations not explicitly described may be performed as well.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
at a mobile computing device including a touchscreen display, a transceiver, a non-transitory memory that stores computer readable instructions, and one or more processors that execute the computer readable instructions stored in the non-transitory memory:
receiving, via the transceiver, a link associated with a native application that is not installed on the mobile computing device, wherein the link indicates a particular state of the native application;
displaying an indication of the link on the touchscreen display;
detecting, via the touchscreen display, a user selection of the link;
upon detecting the user selection of the link, providing access to a digital distribution platform that enables a user of the mobile computing device to download and install the native application;
downloading and installing the native application onto the mobile computing device; and
upon downloading and installing the native application, automatically launching the native application into the particular state indicated by the link, wherein the particular state is different from a default state into which the native application launches when an icon corresponding with the native application is selected.

2. The method of claim 1, wherein the link comprises an application access mechanism for the particular state.

3. The method of claim 2, wherein the native application is launched into the particular state via the application access mechanism.

4. The method of claim 1, wherein providing access to the digital distribution platform comprises:
determining whether the native application is installed at the mobile computing device.

5. The method of claim 4, wherein providing access to the digital distribution platform comprises:
determining that the native application is not installed at the mobile computing device; and
providing access to the digital distribution platform in response to determining that the native application is not installed at the mobile computing device.

6. The method of claim 1, wherein providing access to the digital distribution platform comprises:
accessing a site associated with the digital distribution platform.

7. The method of claim 1, wherein downloading and installing the native application comprises:
displaying a user-selectable button to download and install the native application;
detecting a user selection of the user-selectable button; and
downloading and installing the native application in response to detecting the user selection of the user-selectable button.

8. A mobile computing device comprising:
a touchscreen display;
a transceiver;
one or more processors;
a non-transitory memory that stores computer readable instructions that cause the one or more processors to:
receive, via the transceiver, a link associated with a native application that is not installed on the mobile computing device, wherein the link indicates a particular state of the native application;
display an indication of the link on the touchscreen display;
detect, via the touchscreen display, a user selection of the link;
upon detecting the user selection of the link, provide access to a digital distribution platform that enables a user of the mobile computing device to download and install the native application;
download and install the native application onto the mobile computing device; and
upon downloading and installing the native application, automatically launch the native application into the particular state indicated by the link, wherein the particular state is different from a default state into which the native application launches when an icon corresponding with the native application is selected.

9. The mobile computing device of claim 8, wherein the link comprises an application access mechanism for the particular state.

10. The mobile computing device of claim 9, wherein the native application is launched into the particular state via the application access mechanism.

11. The mobile computing device of claim 8, wherein providing access to the digital distribution platform comprises:
 determining whether the native application is installed at the mobile computing device.

12. The mobile computing device of claim 11, wherein providing access to the digital distribution platform comprises:
 determining that the native application is not installed at the mobile computing device; and
 providing access to the digital distribution platform in response to determining that the native application is not installed at the mobile computing device.

13. The mobile computing device of claim 8, wherein providing access to the digital distribution platform comprises:
 accessing a site associated with the digital distribution platform.

14. The mobile computing device of claim 8, wherein downloading and installing the native application comprises:
 displaying a user-selectable button to download and install the native application;
 detecting a user selection of the user-selectable button; and
 downloading and installing the native application in response to detecting the user selection of the user-selectable button.

15. A computer program product encoded on a non-transitory computer readable storage medium comprising instructions that when executed by a mobile computing device, cause the mobile computing device to perform operations comprising:
 receiving a link associated with a native application that is not installed on the mobile computing device, wherein the link indicates a particular state of the native application;
 displaying an indication of the link on a touchscreen display of the mobile computing device;
 detecting, via the touchscreen display, a user selection of the link;
 upon detecting the user selection of the link, providing access to a digital distribution platform that enables a user of the mobile computing device to download and install the native application;
 downloading and installing the native application onto the mobile computing device; and
 upon downloading and installing the native application, automatically launching the native application into the particular state indicated by the link, wherein the particular state is different from a default state into which the native application launches when an icon corresponding with the native application is selected.

16. The computer program product of claim 15, wherein the link comprises an application access mechanism for the particular state.

17. The computer program product of claim 16, wherein the native application is launched into the particular state via the application access mechanism.

18. The computer program product of claim 15, wherein providing access to the digital distribution platform comprises:
 determining whether the native application is installed at the mobile computing device.

19. The computer program product of claim 18, wherein providing access to the digital distribution platform comprises:
 determining that the native application is not installed at the mobile computing device; and
 providing access to the digital distribution platform in response to determining that the native application is not installed at the mobile computing device.

20. The computer program product of claim 15, wherein providing access to the digital distribution platform comprises:
 accessing a site associated with the digital distribution platform.

* * * * *